US005623370A

United States Patent [19]
Ueda et al.

[11] Patent Number: 5,623,370
[45] Date of Patent: Apr. 22, 1997

[54] GRADIENT INDEX LENS SYSTEM

[75] Inventors: Toshihiko Ueda; Satoshi Iwasaki, both of Toyokawa, Japan; Sanae Watanabe, Storrs, Conn.; Kazuharu Kagoshima; Keijiro Sakamoto, both of Toyokwa, Japan

[73] Assignee: Minolta Camera Kabushiki Kaisha, Osaka, Japan

[21] Appl. No.: 513,415

[22] Filed: Aug. 10, 1995

Related U.S. Application Data

[63] Continuation of Ser. No. 73,753, Jun. 8, 1993, abandoned.

[30] Foreign Application Priority Data

Jun. 11, 1992 [JP] Japan ................................ 4-175956
Apr. 23, 1993 [JP] Japan ................................ 5-119311

[51] Int. Cl.$^6$ ............................................. G02B 3/00
[52] U.S. Cl. ............................................. 359/654
[58] Field of Search ..................................... 359/654

[56] References Cited

U.S. PATENT DOCUMENTS

| | | | |
|---|---|---|---|
| 4,762,403 | 8/1988 | Hattori ........................... | 359/654 |
| 4,830,476 | 5/1989 | Aoki ............................. | 359/654 |
| 4,974,947 | 12/1990 | Kitagishi et al. ................ | 359/653 |
| 5,046,833 | 9/1991 | Tsuchida ......................... | 359/654 |
| 5,117,308 | 5/1992 | Tsuchida et al. .................. | 359/654 |
| 5,172,272 | 12/1992 | Aoki ............................. | 359/654 |
| 5,184,251 | 2/1993 | Tsuchida et al. .................. | 359/654 |
| 5,235,464 | 8/1993 | Tsuchioa ......................... | 359/654 |

FOREIGN PATENT DOCUMENTS 2285312  11/1990  Japan.

OTHER PUBLICATIONS

Design of Optical Systems Using Radial Grin Lenses, Norihiko Aoki et al., Olumpus Optical Co., Ltd., T. Morokuma Research Lab, 1991.

"Design of a Gradient–Index Photographic Objective", L. G. Atkinson et al. Applied Optics, vol. 21, No. 6, Mar. 15, 1982.

*Primary Examiner*—Georgia Y. Epps
*Assistant Examiner*—John P. Cornley
*Attorney, Agent, or Firm*—Price, Gess & Ubell

[57] ABSTRACT

A radial gradient index lens system has a refractive index distribution. The refractive index decreases from an optical axis along a height. The lens system has two meniscus lens elements whose convex surfaces have a larger radius of curvature than concave surfaces. The meniscus lens elements are arranged symmetrically with respect to an aperture stop so that the convex surfaces thereof face an object side and an image side, respectively. The gradient index lens system is for use in a copying apparatus or as a reading optical system.

24 Claims, 15 Drawing Sheets

FNO 10

-2.0   2.0
Spherical
aberration

Y=150

-2.0   2.0
Astigmatism

Y=150

-0.1   0.1(%)
Distortion

F6.5
-0.2  0.2
Spherical aberration

Y'= 33
DS ——— d
DT --- d
-0.2  0.2
Astigmatism

Y'= 33
-0.05  0.05(%)
Distortion

F6.5

-0.2  0.2
Spherical
aberration

Y'=33

-0.2  0.2
Astigmatism

Y'=33

-0.05  0.05(%)
Distortion

Spherical aberration

Astigmatism

Distortion

Spherical aberration

Astigmatism

Distortion

Spherical aberration

Astigmatism

Distortion

Spherical aberration

Astigmatism

Distortion

F6.5
-0.2  0.2
Spherical aberration

Y'=33
-0.2  0.2
Astigmatism

Y'=33
-0.05  0.05(%)
Distortion

GRADIENT INDEX LENS SYSTEM

This is a continuation of application Ser. No. 08/073,753, filed Jun. 8, 1993, now abandoned.

BACKGROUND OF THE INVENTION

1. Field of the Invention

The present invention relates to a gradient index (GRIN) lens system in which two lenses are employed having a refractive index distribution from the optical axis along the height (i.e. radial refractive index distribution).

2. Description of the Prior Art

As a radial lens system having a refractive index distribution in a direction vertical to the optical axis and an axial lens system having a refractive index distribution along the optical axis, lens systems of comparatively small size such as objective lenses for optical discs have already been put into practical use. Lens systems of large size, however, have not yet been put into practical use because of the problem of the cost of manufacture.

Accordingly, radial and axial lens systems have hardly ever been used as optical systems for use in copying apparatuses which should be of large size and reading lens systems for use in image scanners. However, GRIN lens systems, which can be made compact by reducing the number of lens elements, are highly promising in the future. The following are some of the GRIN lens systems which have been proposed so far: (1) "Design of a Gradient-index Photographic Objective", *Applied Optics* Vol. 21, No. 6 shows an example of a design of a two-element photographic lens system; (2) U.S. Pat. No. 4,974,947 discloses two-element and three-element axial GRIN lens systems; (3) Japanese Laid-open Patent Application No. H2-285312 discloses a video and a photographic lens system in which at least one radial GRIN lens is used; and (4) "Design of an Optical System in Which a Radial GRIN Lens Is Used" (1991), Lectures at the 16th optics symposium, pages 39 to 40. All of them are photographic lens systems.

The lens system of (1) presents the problems of high cost and inferior processing capability since first and second lens elements thereof are very thick. Further, correction of chromatic aberration is not considered. The lens system of (2) is a wide angle lens system in which an axial GRIN lens is used having a refractive index distribution where the refractive index varies along the optical axis. Only data on a mono color are shown. In the lens system of (3), a radial GRIN lens is used mainly for correcting chromatic aberration. GRIN lens is applied to only one lens element of the photographic lens system including a plurality of lens elements. In the lecture of (4), achromatizing conditions required when the total power which is the sum of the powers of lens configuration and lens material is negative are obtained. As an application thereof, a method to obtain achromatizing conditions required when the total power is positive is shown. However, the example of the design is intended to reduce the total length of a zoom lens system.

On the other hand, for the reading lens systems for use in image scanners, the condition of chromatic aberration is strict compared to the photographic lens system. Accordingly, four to six lens elements are required when the lens system is the conventional spherical lens system of uniform configuration and material. Similarly, in the conventional lens systems for use in copying apparatuses having uniform refractive indices, at least three lens elements are required.

For the copying apparatuses and image scanners, reduction of size is strongly demanded, and accordingly, for the lens systems for use in those apparatuses, reduction of the number of lens elements and reduction of size are also strongly demanded.

SUMMARY OF THE INVENTION

An object of the present invention is to provide a GRIN lens system where the number of lens elements has largely been reduced, said GRIN lens being provided with performance required for lens systems for use in copying apparatuses and for image reading lens systems.

According to the first feature of the present invention, a radial GRIN lens system having a refractive index distribution where the refractive index decreases from the optical axis along the height is of a symmetrical type comprising two meniscus lens elements whose convex surfaces have a larger radius of curvature than concave surfaces, said meniscus lens elements being arranged symmetrically with respect to an aperture stop so that the convex surfaces thereof face an object side and an image side, respectively. The GRIN lens system fulfills the following conditions:

$$v0 < v1d$$

$$0.20 > \Sigma P > -0.05$$

where $v0$ represents an axial Abbe number of the GRIN lens, $v1d$ is calculated by $$\frac{N1d}{N1F - N1C}$$

where $N1d$ represents a secondary gradient index coefficient of d-line, $N1F$ represents a secondary gradient index coefficient of F-line and $N1C$ represents a secondary gradient index coefficient of C-line, and $\Sigma P$ represents a Petzval sum of the lens system.

According to the second feature of the present invention, a GRIN lens system includes two radial GRIN lenses each having a refractive index distribution from the optical axis along the height. In the two GRIN lenses, the power of lens configuration is negative and the power of lens material is positive, and the total power is positive.

According to the third feature of the present invention, in a GRIN lens system, with respect to at least one of two GRIN lenses, the power of lens configuration is negative and the power of lens material is positive, and the total power thereof is positive.

According to the fourth feature of the present invention, in a GRIN lens system, the power of lens configuration of a first lens element is negative and the power of lens material thereof is positive, and the power of lens configuration of a second lens element is positive and the power of lens material thereof is positive.

According to the fifth feature of the present invention, in a GRIN lens system, the power of lens configuration of a first lens element is positive and the power of lens material thereof is positive, and the power of lens configuration of a second lens element is negative and the power of lens material thereof is positive.

According to the sixth feature of the present invention, in a GRIN lens system, the power of lens configuration of a first lens element is negative and the power of lens material thereof is positive, and the power of lens configuration of a second lens is positive and the power of lens material thereof is negative.

BRIEF DESCRIPTION OF THE DRAWINGS

This and other objects and features of this invention will become clear from the following description, taken in conjunction with the preferred embodiments with reference to the accompanied drawings in which.

BRIEF DESCRIPTION OF THE EMBODIMENTS

Figure 1:
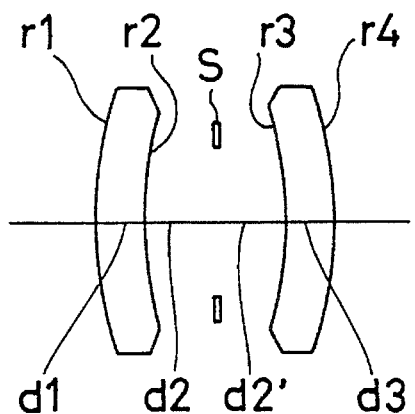
FIG. 1 is a cross-sectional view showing the lens arrangement of a first embodiment of the present invention.
Figure 2A:
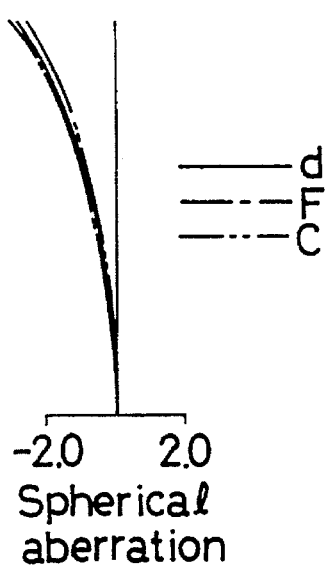
FIGS. 2A to 2C are graphic representations of spherical aberration, astigmatism and distortion of the lens system of FIG. 1, respectively.
Figure 2B:
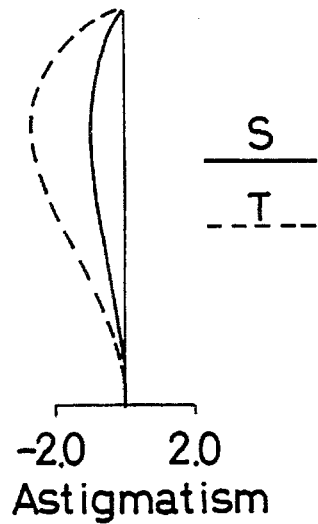
Figure 2C:
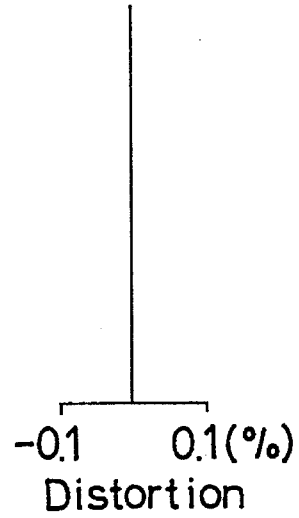
Figure 3:
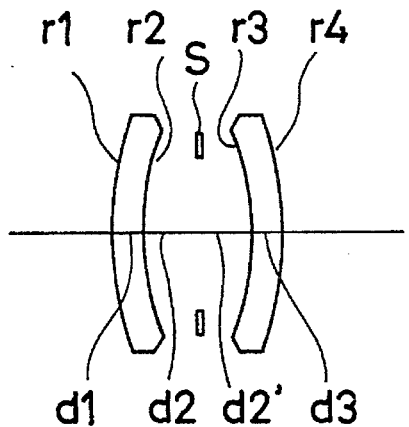
FIG. 3 is a cross-sectional view showing the lens arrangement of a second embodiment of the present invention.
Figure 6A:
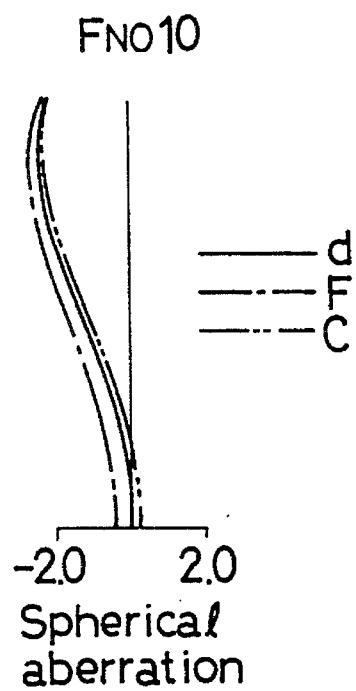
FIGS. 6A to 6C are graphic representations of spherical aberration, astigmatism and distortion of the lens system of FIG. 5, respectively.
Figure 6B:
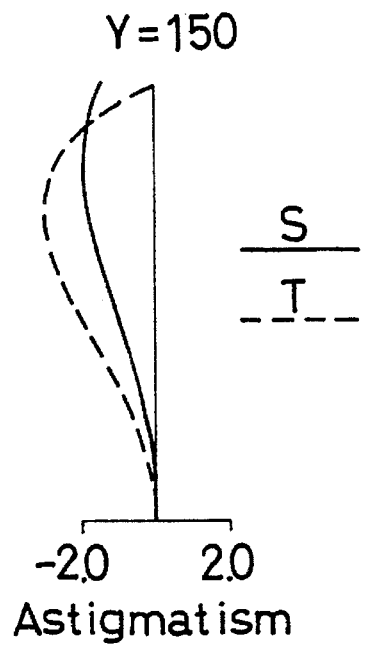
Figure 6C:
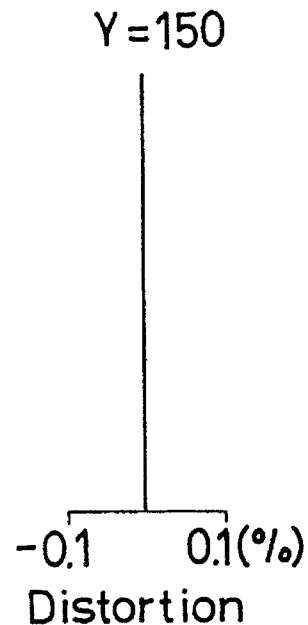
Figure 7:
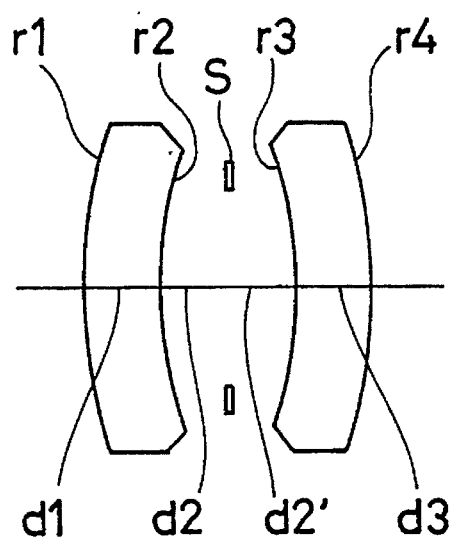
FIG. 7 is a cross-sectional view showing the lens arrangement of a fourth embodiment of the present invention.
Figure 4A:
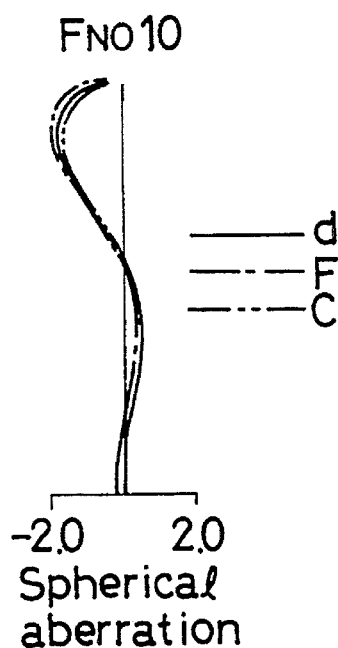
FIGS. 4A to 4C are graphic representations of spherical aberration, astigmatism and distortion of the lens system of FIG. 3, respectively.
Figure 4B:
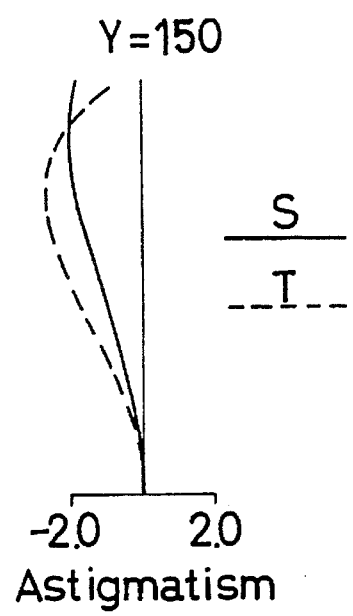
Figure 4C:
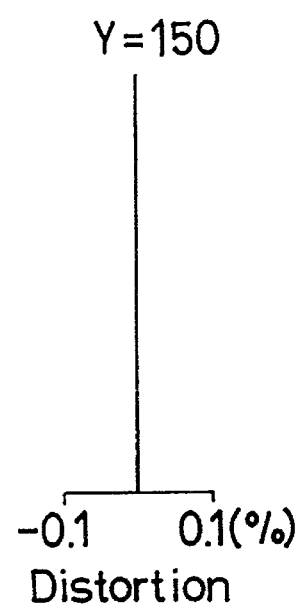
Figure 5:
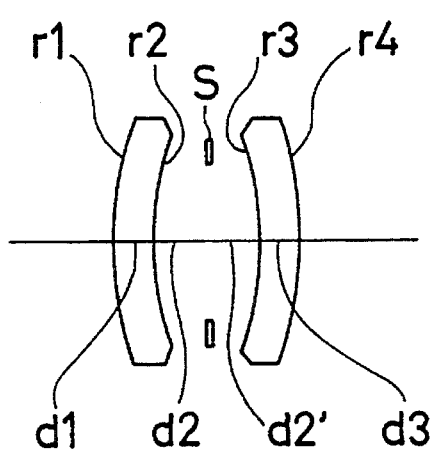
FIG. 5 is a cross-sectional view showing the lens arrangement of a third embodiment of the present invention.
Figure 8A:
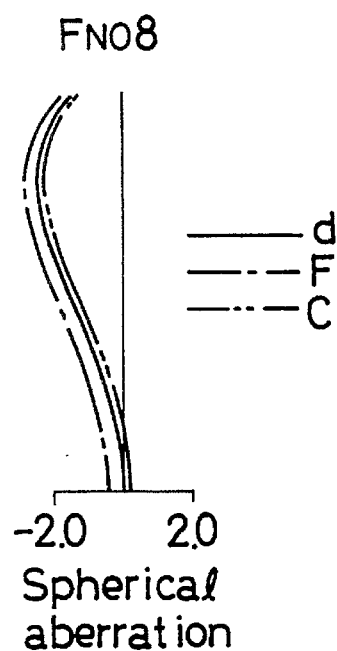
FIGS. 8A to 8C are graphic representations of spherical aberration, astigmatism and distortion of the lens system of FIG. 7, respectively.
Figure 8B:
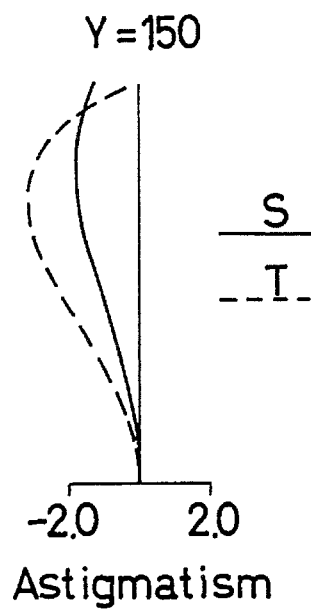
Figure 8C:
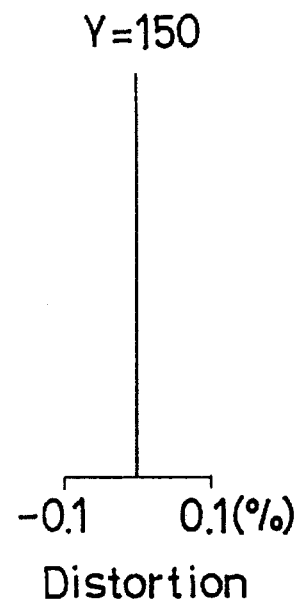

A radial GRIN lens system of the present invention is of a symmetrical type comprising two meniscus lens elements whose convex surfaces have a larger radius of curvature than concave surfaces, said meniscus lens elements being arranged symmetrically with respect to an aperture stop so that the convex surfaces thereof face an object side and an image side, respectively. The GRIN lens system fulfills the following conditions:

$$v0 < v1d \tag{1}$$

$$0.20 > \Sigma P > -0.05 \tag{2}$$

where $v0$ represents an axial Abbe number of the GRIN lens, $v1d$ is calculated by $$\frac{N1d}{N1F - N1C}$$

where $N1d$ represents a secondary gradient index coefficient of d-line, $N1F$ represents a secondary gradient index coefficient of F-line and $N1C$ represents a secondary gradient index coefficient of C-line, and $\Sigma P$ represents a Petzval sum of the lens system.

For a copying apparatus where a lens system is used approximately at unity magnification, a symmetrical lens system has frequently been used. The advantage of the symmetrical lens system is that the designing is easy. This is because correction of only longitudinal aberrations has to be considered since lateral aberrations such as distortion, lateral chromatic aberration and coma are restrained. Moreover, it has been known that by using a radial GRIN lens having a gradient index distribution from the optical axis along the height, chromatic aberration can be corrected. In view of the above, in the present invention, with a completely symmetrical arrangement where two same radial GRIN lenses are used, axial chromatic aberration is also excellently corrected.

The GRIN lenses of the present invention are meniscus lenses whose convex surfaces have a larger radius of curvature than the concave surfaces thereof. When the surfaces are denoted by, from the convex surface on the left side, a first surface, a second surface, a third surface and a fourth surface, respectively, the first and fourth surfaces at the outside have positive power since the refractive power thereof gradually decreases from the optical axis along the height within the lens material, whereas the second and third surfaces at the inside have negative power. With an arrangement where an aperture stop S is arranged between the two lenses and the convex surfaces are arranged at the outside, the convex surfaces and the lens material produce positive power and the two concave surfaces produce negative power, which produces a power arrangement of positive, negative, positive as a whole. This arrangement is the same as those of what is called the triplet type lens system and the Gauss type lens system. Since the positive power is dispersed due to the convex surfaces and the lens material, aberration correction is excellently made.

Since the refractive indices vary along the height of the lens from the optical axis, the lens material will have a positive power when the indices of refraction increase from the optical axis to the outer edge of the lens and will have a negative power when the indices of refraction decrease from the optical axis to the outer edge.

It is well known that the correction expression of chromatic aberration is $\phi S/v0+\phi M/v1d$ where $\phi S$ represents the power of lens configuration, $\phi M$ represents the power of lens material. In the lens systems of the present invention, since $\phi S<0$ and $\phi M>0$, the off-axial Abbe number is smaller than the axial Abbe number. Therefore, it is natural that $v1d>0$. By fulfilling the condition (1), F-line and C-line are corrected with good balance. When the condition (1) is not fulfilled, the difference between the axial and off-axial Abbe numbers are so small that it is impossible to correct chromatic aberration.

In order to excellently correct field curvature, it is required that the Petzval sum $\Sigma P$ fulfills the condition (2).

Subsequently, specific embodiments of the lens system for use in a copying apparatus using the GRIN lenses of the present invention will be described. FIGS. 1, 3, 5 and 7 are cross-sectional view showing the lens arrangements of first to fourth embodiments, respectively. Numerical data thereof are shown in Tables 1 to 4, respectively. In each table, radii of curvature ri of an ith surface from the object side and axial distances are shown. Since all of the lenses are GRIN lenses, axial refractive indices and Abbe numbers to d-line, and gradient index coefficients are also shown. Since the lens systems are completely symmetrical, data of only one lens element are shown.

The refractive index distribution is defined by $$N(r)=N0+N1r2+N2r4+N3r6+N4r8+ \ldots \quad (3)$$

where N(r) represents a refractive index at a height r from the optical axis, N0 represents an axial refractive index and Ni represents a gradient index coefficient.

FIGS. 2A to 2C, 4A to 4C, 6A to 6C and 8A to 8C are graphic representations of spherical aberration, astigmatism and distortion of the first to fourth embodiments. From the figures, it is understood that each aberration is extremely excellently corrected. The values of v0, v1d and $\Sigma P$ of the conditions (1) and (2) for the first to fourth embodiments are shown in Table 16.

Subsequently, GRIN lens systems used as reading lens systems for use in image scanners will be described in accordance with five implementations thereof. In a first implementation, the power of lens configuration of each of the two radial GRIN lenses is negative and the power of lens material thereof is positive. The total power is positive. In a second implementation, with respect to at least one of two GRIN lenses, the power of lens configuration is negative and the power of lens material thereof is positive. The total power is positive. In a third implementation, the power of lens configuration of a first lens element is negative and the power of lens material thereof is positive, and the power of lens configuration of a second lens element is positive and the power of lens material thereof is positive. In a fourth implementation, the power of lens configuration of a first lens element is positive and the power of lens material thereof is positive, and the power of lens configuration of a second lens element is negative and the power of lens material thereof is positive. In a fifth implementation, the power of lens configuration of a first lens element is negative and the power of lens material thereof is positive, and the power of lens configuration of a second lens element is positive and the power of lens material is negative.

Hereinafter, specific embodiments of the above-mentioned first to fifth implementations will be described.

Figure 9:
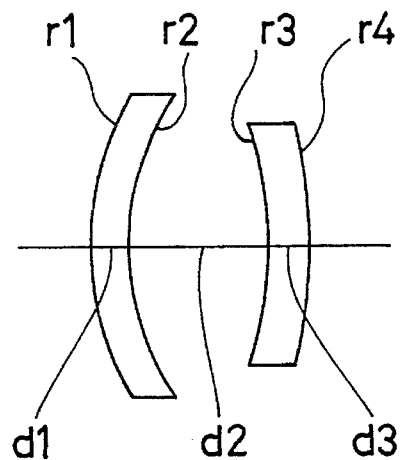
FIG. 9 is a cross-sectional view showing the lens arrangement of a fifth embodiment of the present invention.
Figure 10A:
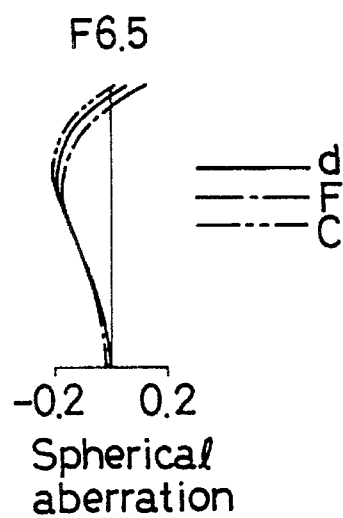
FIGS. 10A to 10C are graphic representations of spherical aberration, astigmatism and distortion of the lens system of FIG. 9, respectively.
Figure 10B:
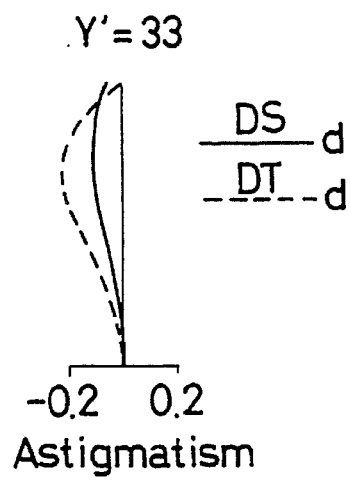
Figure 10C:
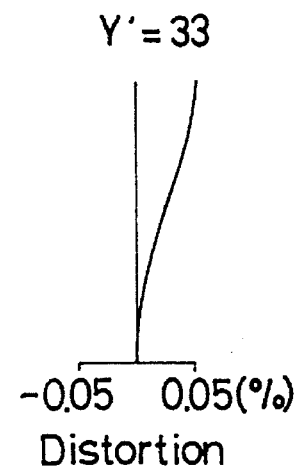
Figure 11:
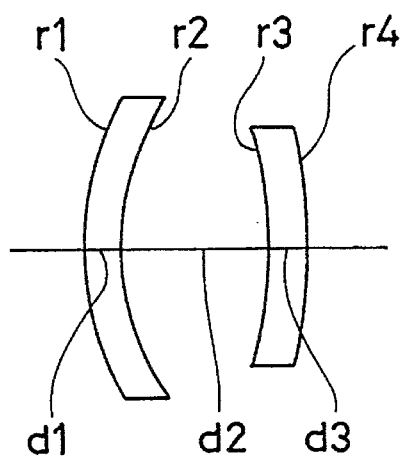
FIG. 11 is a cross-sectional view showing the lens arrangement of a sixth embodiment of the present invention.
Figure 12A:
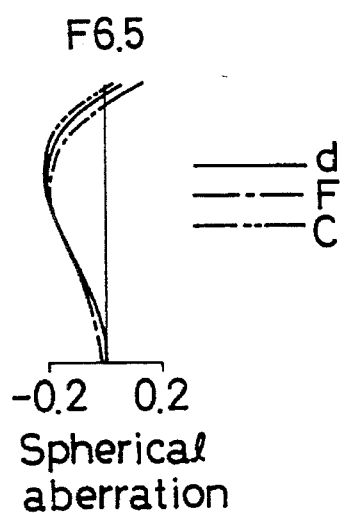
FIGS. 12A to 12C are graphic representations of spherical aberration, astigmatism and distortion of the lens system of FIG. 11, respectively.
Figure 12B:
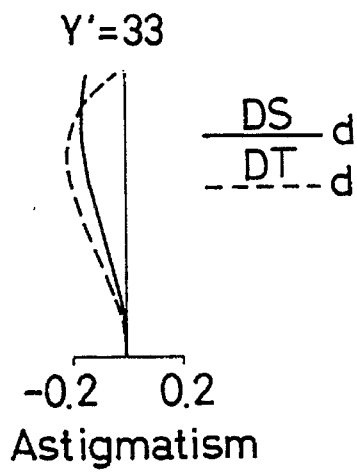
Figure 12C:
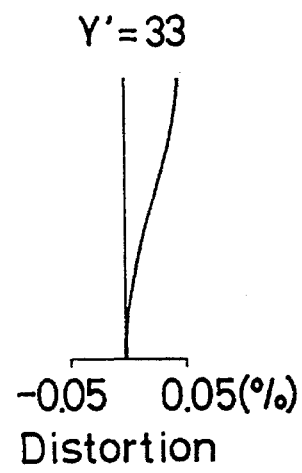

As the first implementation, fifth and sixth embodiments will be described. The lens arrangements thereof are shown in FIGS. 9 and 11, respectively. These embodiments comprise a first meniscus lens element convex to the object side and a second meniscus lens element convex to the image side. In both the first and second meniscus lens elements, the power of lens configuration is negative and the power of lens material is positive, and the total power of each lens element is positive. Regarding the power of lens material, the refractive index decreases from the optical axis along the height. Specifically, the first convex surface r1 from the object side and the lens material produce positive power, the two concave surfaces r2 and r3 at the inside produce negative power, and the most image side surface r4 produces positive power, which produces a power arrangement of positive, negative, positive as a whole. This arrangement is the same as those of what is called the triplet type lens system and the Gauss type lens system. Since the positive power is dispersed due to the convex surface and the lens material, aberration correction is excellently made.

Numerical data of the fifth and sixth embodiments are shown in Tables 5 and 6. Spherical aberration, astigmatism and distortion thereof are shown in FIGS. 10A to 10C and 12A to 12C. The refractive power distribution is generally defined by the previously-described equation (3).

In each table, N10 represents an axial refractive index of the first lens element to d-line, N20 represents an axial refractive index of the second lens element to d-line, v10 represents an axial Abbe number of the first lens element, v20 represents an axial Abbe number of the second lens element, N2d represents a secondary gradient index coefficient to d-line, N4d represents a quartic gradient index coefficient to d-line, N2F represents a secondary gradient index coefficient to F-line, and N2C represents a secondary gradient index coefficient to C-line.

Regarding axial chromatic aberration, it is required that both the first and second lens elements fulfill the following condition:

$$vi0<vi' \quad (4)$$

where vi0 represents an axial Abbe number of an ith lens element and vi' is calculated by $$\frac{N_{2d}^i}{N_{2F}^i - N_{2C}^i}$$

where $N_{2d}^i$ represents a secondary gradient index coefficient of the ith lens element to d-line, $N_{2F}^i$ represents a secondary gradient index coefficient of the ith lens element to F-line and $N_{2C}^i$ is a secondary gradient index coefficient of the ith lens element to C-line.

The condition (4) is a condition required for excellently correcting mainly axial chromatic aberration. When this condition is not fulfilled, it is difficult to correct chromatic aberration.

The fifth and sixth embodiments also fulfill the following conditions:

$$0.7 < \frac{f1}{f2} < 1.5 \tag{5}$$

$$0 < \Sigma P < 0.10 \tag{6}$$

$$-0.7 < \frac{\psi iS}{\psi iM} < -0.3 \tag{7}$$

where f1 represents a focal length of the ith lens element (total of the lens configuration and lens material), $\psi iS$ represents the power of lens configuration of the ith lens element, $\psi iM$ represents the power of lens material of the ith lens element, and $\Sigma P$ represents a Petzval sum.

The condition (5) is a condition for appropriately determining the powers of the first and second lens elements. When the upper limit or the lower limit thereof is exceeded, the aberration correcting load on one of the lens elements increases, so that it is impossible to sufficiently correct aberrations. The condition (6) is a condition for excellently correcting field curvature. When the Petzval sum exceeds the upper limit of the condition (6), field curvature is undercorrected. When the Petzval sum exceeds the lower limit thereof, field curvature is overcorrected. The condition (7) is a condition required for appropriately determining the ratio of the power of lens configuration to the power of lens material of each of the first and second lens elements. When the upper limit of the condition (7) is exceeded, chromatic aberration is overcorrected. When the lower limit thereof is exceeded, chromatic aberration is undercorrected, so that it is impossible to sufficiently correct coma.

Values in connection with the conditions (4) to (7) for the fifth and sixth embodiments are shown in Table 17.

Figure 13:
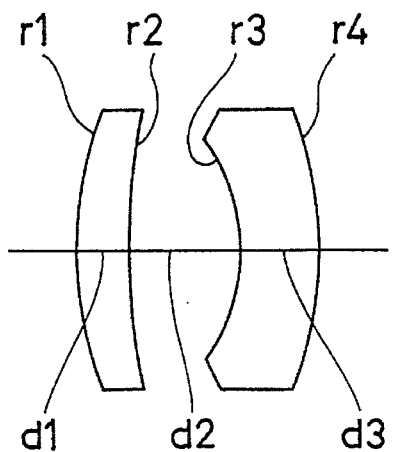
FIG. 13 is a cross-sectional view showing the lens arrangement of a seventh embodiment of the present invention.
Figure 14A:
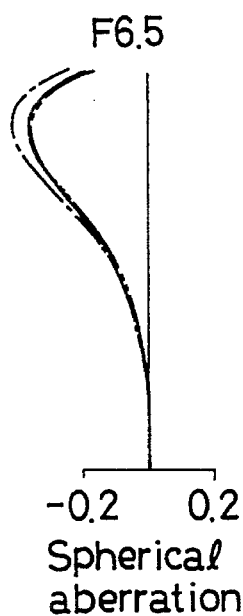
FIGS. 14A to 14C are graphic representations of spherical aberration, astigmatism and distortion of the lens system of FIG. 13, respectively.
Figure 14B:
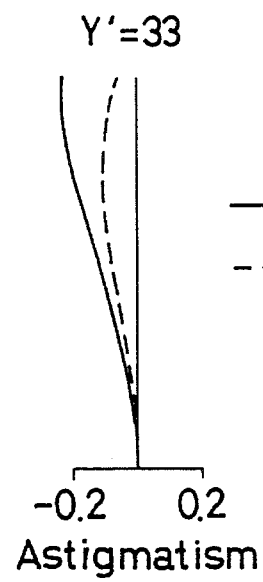
Figure 14C:
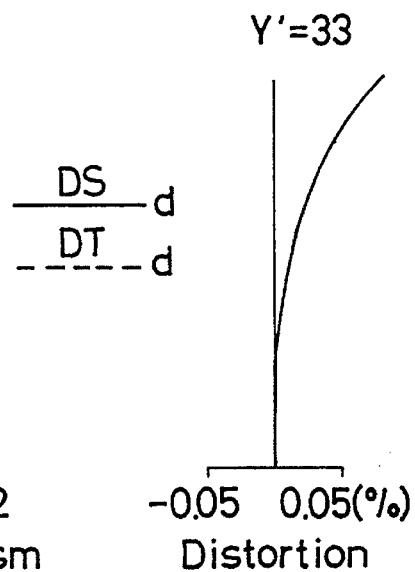
Figure 15:
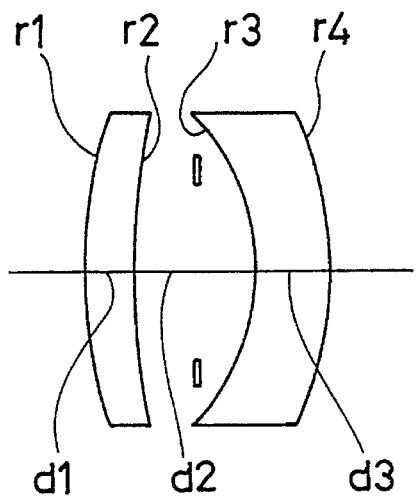
FIG. 15 is a cross-sectional view showing the lens arrangement of an eighth embodiment of the present invention.
Figure 16A:
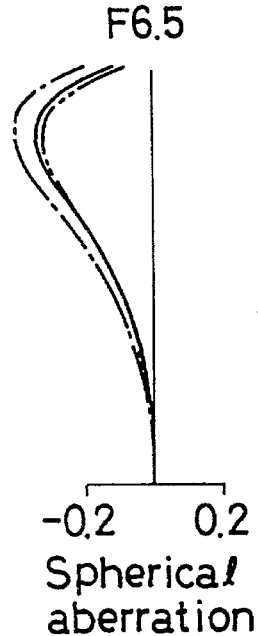
FIGS. 16A to 16C are graphic representations of spherical aberration, astigmatism and distortion of the lens system of FIG. 15, respectively.
Figure 16B:
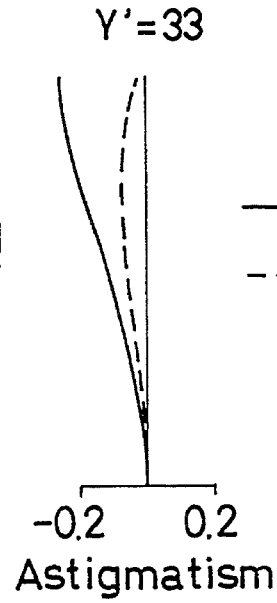
Figure 16C:
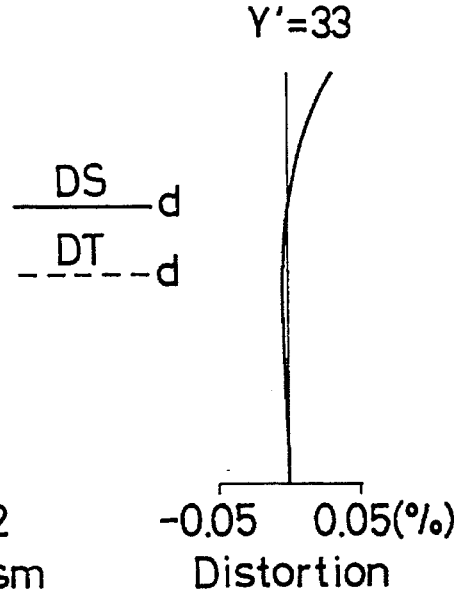

As the second implementation, seventh and eighth embodiments will be described. The lens arrangements thereof are shown in FIGS. 13 and 15, respectively. These embodiments comprise a first meniscus lens element convex to the object side and a second meniscus lens element convex to the image side. In the first lens element, the power of lens configuration is positive and the power of lens material is negative, and the total power of this lens element is positive. In the second lens element, the power of lens configuration is negative and the power of lens material is positive, and the total power of this lens element is positive. Since the power of lens configuration and the power of lens material between the first and second lens elements are opposite, aberration correction is excellently made.

Numerical data of the seventh and eighth embodiments are shown in Tables 7 and 8. Spherical aberration, astigmatism and distortion thereof are shown in FIGS. 14A to 14C and 16A to 16C. Similarly to the first implementation, the refractive power distribution is generally defined by the equation (3).

Regarding axial chromatic aberration, it is required that both the first and second lens elements fulfill the following condition:

$$0 < vi' < v10 \tag{8}$$

where:

vi' is calculated by $$\frac{N_{2d}^i}{N_{2F}^i - N_{2C}^i}$$

where $N_{2d}^i$ represents a secondary gradient index coefficient of the ith lens element to d-line, $N_{2F}^i$ represents a secondary gradient index coefficient of the ith lens element to F-line and $N_{2C}^i$ is a secondary gradient index coefficient of the ith lens element to C-line; and v10 represents an axial Abbe number of the first lens element.

The condition (8) is required to restrain, particularly, axial chromatic aberration by setting the Abbe number within the range defined by the condition (8). When the condition (8) is not fulfilled, it is impossible to correct chromatic aberration.

The seventh and eighth embodiments also fulfill the following conditions:

$$2 < \frac{f2}{f} < 3 \tag{9}$$

$$-0.9 < \frac{\psi 2S}{\psi 2M} < -0.7 \tag{10}$$

$$-0.01 < \Sigma P < 0.05 \tag{11}$$

$$0.3 < \frac{f1}{f2} < 0.7 \tag{12}$$

where f represents a focal length of the entire lens system (total of the lens configuration and lens material), f1 represents a focal length of the first lens element (total of the lens configuration and lens material), f2 represents a focal length of the second lens element (total of the lens configuration and lens material), $\psi 2S$ represents the power of lens configuration of the second lens element, $\psi 2M$ represents the power of lens material of the second lens element, and $\Sigma P$ represents a Petzval sum.

The condition (9) is a condition for determining the power of the second lens element. When the upper limit thereof is exceeded, the power of lens configuration is so large that aberration generation amount increases. As a result, spherical aberration and astigmatism are overcorrected. In order to solve this problem, it is necessary to further increase the refractive power difference, which increases the manufacturing load. Such lens systems are of no practical use. When the lower limit of the condition (9) is exceeded, the power of lens material is so large that chromatic aberration is overcorrected. The condition (10) is a condition for appropriately determining the powers of lens configuration and lens material of the second lens element. When the upper limit thereof is exceeded, the power of lens material is large compared to the power of lens configuration, so that chromatic aberration is overcorrected. When the lower limit thereof is exceeded, the power of lens configuration is large, so that it is impossible to sufficiently correct coma. The condition (11) is a condition required for correcting field curvature. When the upper limit thereof is exceeded, field curvature is undercorrected. When the lower limit thereof is exceeded, field curvature is overcorrected. The condition (12) is a condition for determining the powers of the first and second lens elements. When the upper limit thereof is exceeded, the aberration correcting load on the second lens element increases, so that it is impossible to sufficiently correct aberrations. When the lower limit thereof is exceeded, the positive power of the first lens element increases, so that both spherical aberration and astigmatism are undercorrected.

Values in connection with the conditions (8) to (12) for the seventh and eighth embodiments are shown in Table 18.

Figure 17:
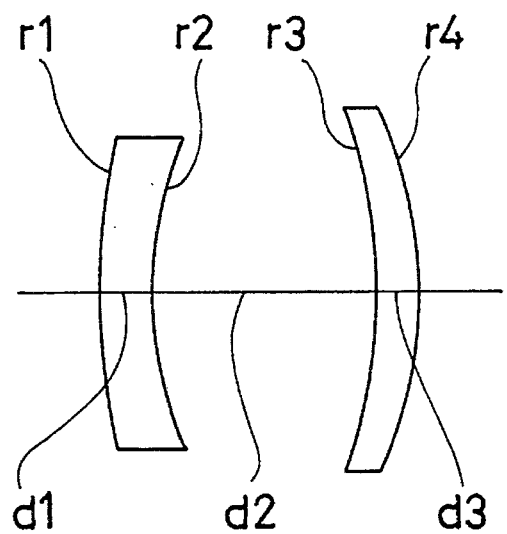
FIG. 17 is a cross-sectional view showing the lens arrangement of a ninth embodiment of the present invention.
Figure 18A:
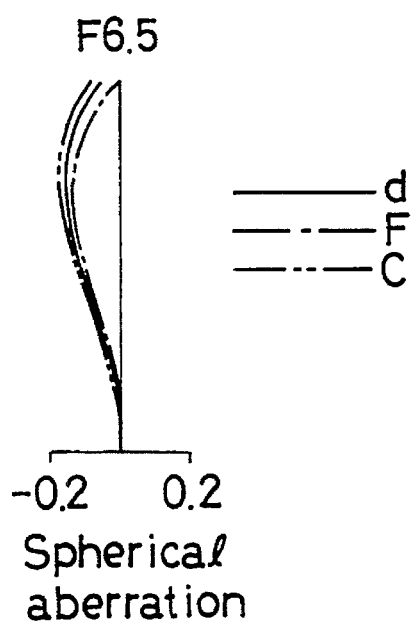
FIGS. 18A to 18C are graphic representations of spherical aberration, astigmatism and distortion of the lens system of FIG. 17, respectively.
Figure 18B:
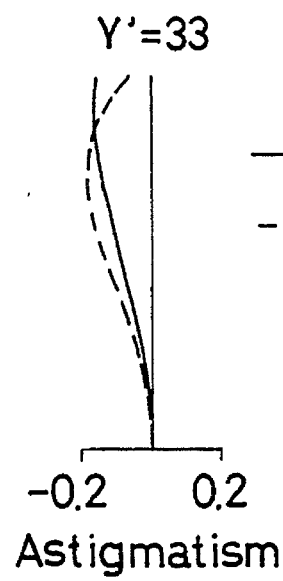
Figure 18C:
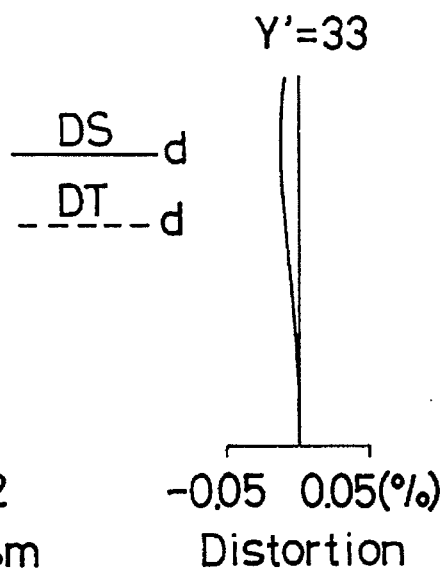
Figure 19:
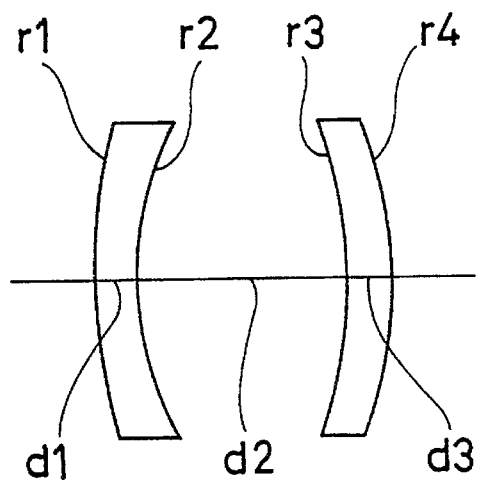
FIG. 19 is a cross-sectional view showing the lens arrangement of a tenth embodiment of the present invention.
Figure 20A:
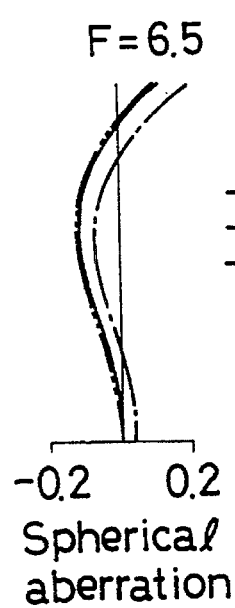
FIGS. 20A to 20C are graphic representations of spherical aberration, astigmatism and distortion of the lens system of FIG. 19, respectively.
Figure 20B:
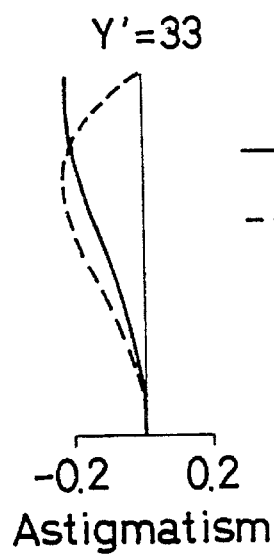
Figure 20C:
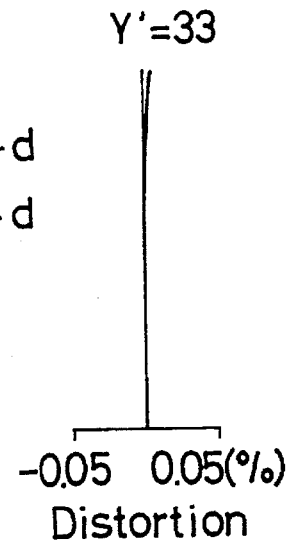

As the third implementation, ninth and tenth embodiments will be described. The lens arrangements thereof are shown in FIGS. 17 and 19, respectively. These embodiments comprise a first meniscus lens element convex to the object side and a second meniscus lens element convex to the image side. In the first lens element, the power of lens configuration is negative and the power of lens material is positive, and the total power of this lens element is positive. In the second lens element, the power of lens configuration is positive and the power of lens material is positive, and the total power of this lens element is positive.

Numerical data of the ninth and tenth embodiments are shown in Tables 9 and 10. Spherical aberration, astigmatism and distortion thereof are shown in FIGS. 18A to 18C and 20A to 20C. Similarly to the previously-described implementations, the refractive power distribution is generally defined by the equation (3).

In the ninth and tenth embodiments, to correct axial chromatic aberration, it is required that the following conditions are fulfilled:

$$\nu i0 < \nu i' \quad (4)$$

$$\nu 2' < 0 \quad (13)$$

$$-2 < \frac{\nu 1'}{\nu 2'} < -0.5 \quad (14)$$

where $\nu i0$ represents an axial Abbe number of an ith lens element; $\nu i'$ represents an Abbe number of the lens material calculated by $$\frac{N_{2d}^i}{N_{2F}^i - N_{2C}^i}$$

where $N_{2d}^i$ represents a secondary gradient index coefficient of the ith lens element to d-line, $N_{2F}^i$ represents a secondary gradient index coefficient of the ith lens element to F-line and $N_{2C}^i$ is a secondary gradient index coefficient of the ith lens element to C-line.

The conditions (4) and (13) are conditions which the first and second lens elements are required to fulfill to excellently correct axial chromatic aberration. The condition (14) is a condition required for correcting axial chromatic aberration and lateral chromatic aberration with good balance as a whole. When the conditions (4) and (13) are fulfilled but the condition (14) is not fulfilled, both correction of axial chromatic aberration and correction of lateral chromatic aberration are difficult.

The ninth and tenth embodiments fulfill the following conditions:

$$0.8 < \frac{f1}{f2} < 1.5 \quad (15)$$

$$0.04 < \Sigma P < 0.11 \quad (16)$$

$$\frac{\psi 2S}{\psi 2M} < 2.5 \quad (17)$$

where f represents a focal length of the entire lens system (total of the lens configuration and lens material), f1 represents a focal length of the first lens element (total of the lens configuration and lens material), f2 represents a focal length of the second lens element (total of the lens configuration and lens material), $\psi 2S$ represents the power of lens configuration of the second lens element, $\psi 2M$ represents the power of lens material of the second lens element, and $\Sigma P$ represents a Petzval sum.

The condition (15) is a condition for determining the powers of the first and second lens elements. When the lower limit or the upper limit thereof is exceeded, the aberration correcting load on one of the lens elements increases, so that it is impossible to sufficiently correct aberrations. The condition (16) is a condition required for correcting field curvature. When the upper limit thereof is exceeded, field curvature is undercorrected. When the lower limit thereof is exceeded, field curvature is overcorrected. The condition (17) is a condition for appropriately determining the powers of lens configuration and lens material of the second lens element. When the upper limit thereof is exceeded, the power of lens material is small compared to that of the configuration, so that it is difficult to correct lateral chromatic aberration.

Values in connection with the conditions (4) and (13) to (17) for the ninth and tenth embodiments are shown in Table 19.

Figure 21:
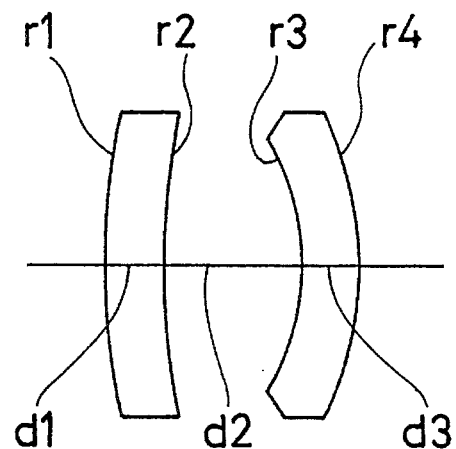
FIG. 21 is a cross-sectional view showing the lens arrangement of an eleventh embodiment of the present invention.
Figure 22A:
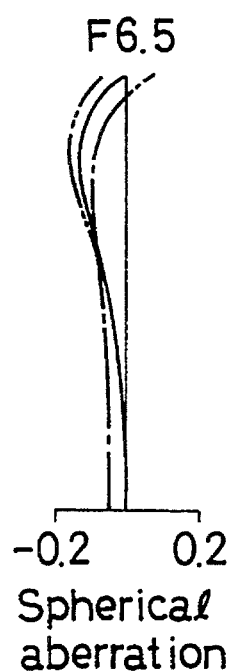
FIGS. 22A to 22C are graphic representations of spherical aberration, astigmatism and distortion of the lens system of FIG. 21, respectively.
Figure 22B:
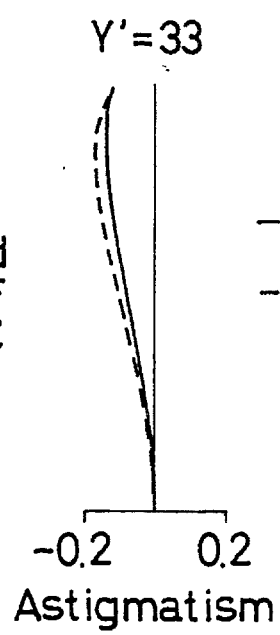
Figure 22C:
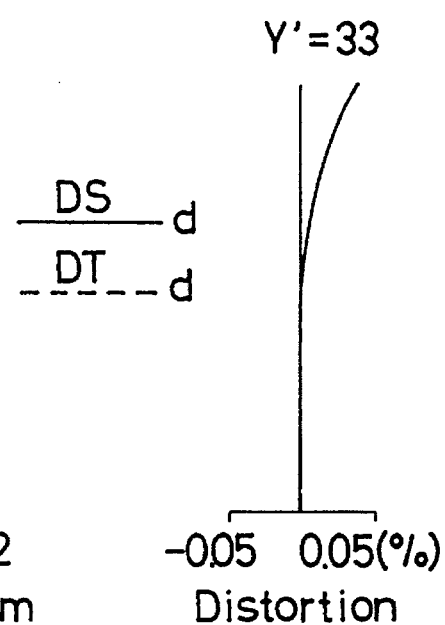
Figure 23:
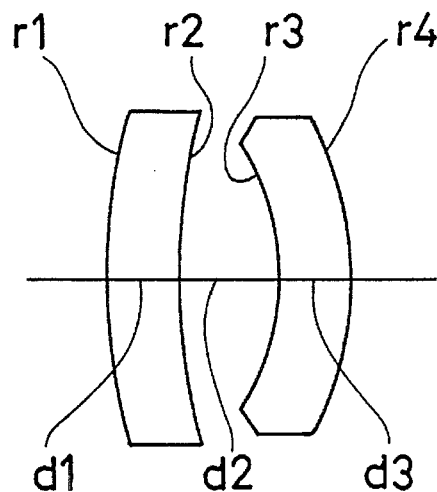
FIG. 23 is a cross-sectional view showing the lens arrangement of a twelfth embodiment of the present invention.
Figure 24A:
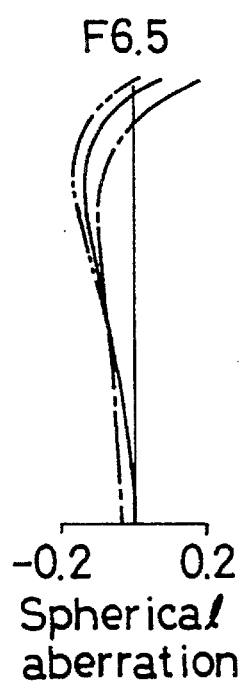
FIGS. 24A to 24C are graphic representations of spherical aberration, astigmatism and distortion of the lens system of FIG. 23, respectively.
Figure 24B:
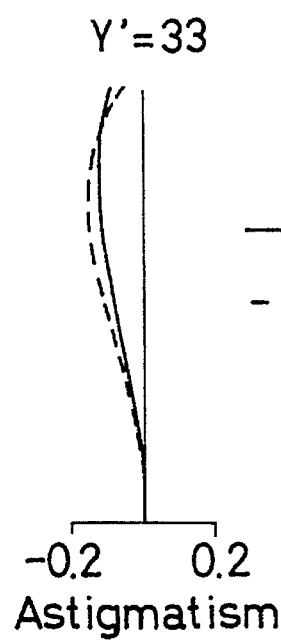
Figure 24C:
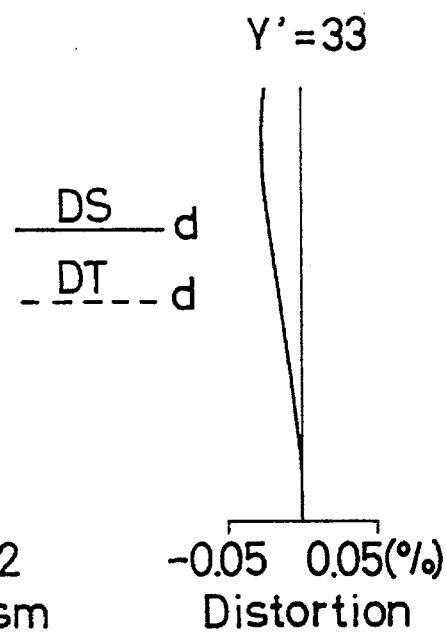
Figure 25:
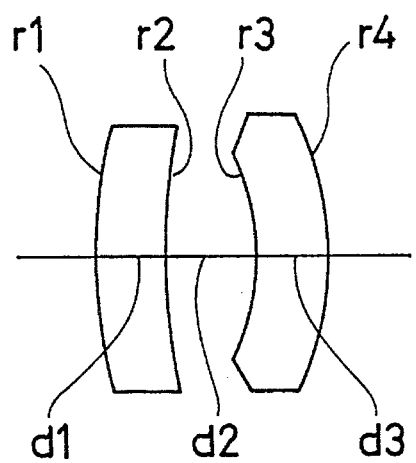
FIG. 25 is a cross-sectional view showing the lens arrangement of a thirteenth embodiment of the present invention.
Figure 26A:
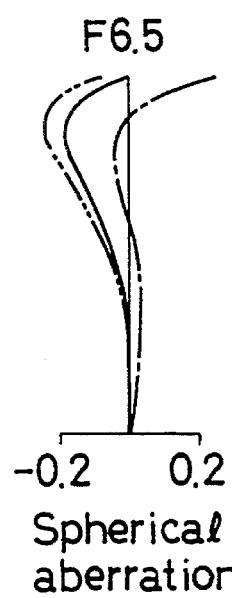
FIGS. 26A to 26C are graphic representations of spherical aberration, astigmatism and distortion of the lens system of FIG. 25, respectively.
Figure 26B:
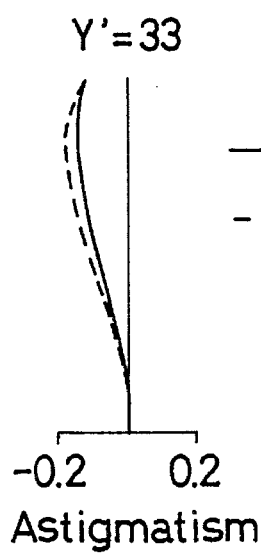
Figure 26C:
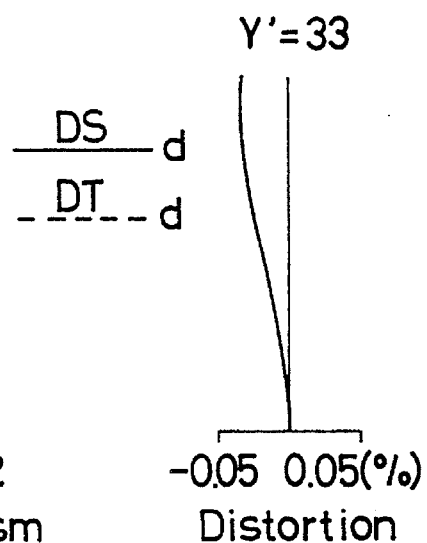

As the fourth implementation, eleventh to thirteenth embodiments will be described. The lens arrangements thereof are shown in FIGS. 21, 23 and 25, respectively. These embodiments comprise a first meniscus lens element convex to the object side and a second meniscus lens element convex to the image side. In the first lens element, both the power of lens configuration and the power of lens material are positive, and the total power of this lens element is positive. In the second lens element, the power of lens configuration is negative and the power of lens material is positive, and the total power of this lens element is positive.

Numerical data of the eleventh to thirteenth embodiments are shown in Tables 11, 12 and 13. Spherical aberration, astigmatism and distortion thereof are shown in FIGS. 22A to 22C, 24A to 24C and 26A to 26C. Similarly to the previously-described implementations, the refractive power distribution is generally defined by the equation (3).

It is required that these embodiments fulfill the following conditions:

$$\nu 20 < \nu 2' \quad (18)$$

$$1.3 < \frac{f2}{f} < 2.5 \quad (19)$$

$$0.1 < \frac{\psi 1S}{\psi 1M} < 1 \quad (20)$$

$$-0.7 < \frac{\psi 2S}{\psi 2M} < -0.5 \quad (21)$$

$$0 < \Sigma P < 0.015 \quad (22)$$

$$0.5 < \frac{f1}{f2} < 1 \quad (23)$$

where:

$\nu 20$ represents an axial Abbe number of the second lens element;

$\nu 2'$ is calculated by $$\frac{N2d}{N2F - N2C}$$

where N2d represents a secondary gradient index coefficient of the second lens element to d-line, N2F represents a secondary gradient index coefficient of the second lens element to F-line and N2C represents a secondary gradient index coefficient of the second lens element to C-line;

f represents a focal length of the entire lens system (total of the lens configuration and lens material);

f1 represents a focal length of the first lens element (total of the lens configuration and lens material);

f2 represents a focal length of the second lens element (total of the lens configuration and lens material);

$\psi 2S$ represents the power of lens configuration of the second lens element;

$\psi 2M$ represents the power of lens material of the second lens element;

$\Sigma P$ represents a Petzval sum.

$\psi 1S$ represents the power of lens configuration of the first lens element; and $\psi 1M$ represents the power of lens material of the first lens element.

The condition (18) is a condition for correcting chromatic aberration. When the condition (18) is not fulfilled, it is impossible to correct chromatic aberration. The condition (19) is a condition for determining the power of the second lens element. When the upper limit thereof is exceeded, the power of lens configuration is so large that aberration generation amount increases. As a result, spherical aberration and astigmatism are overcorrected. In order to solve this problem, it is necessary to further increase the refractive power, which increases the manufacturing load. Such lens systems are of no practical use. When the lower limit of the condition (19) is exceeded, the power of lens material is so large that chromatic aberration is overcorrected. The condition (20) is a condition for determining the powers of lens configuration and lens material of the first lens element. When the upper limit thereof is exceeded, chromatic aberration is undercorrected. When the lower limit thereof is exceeded, the power of lens material is large, so that spherical aberration is overcorrected.

The condition (21) is a condition for appropriately determining the powers of lens configuration and lens material of the second lens element. When the upper limit thereof is exceeded, the power of lens material is large compared to the power of lens configuration, so that chromatic aberration is overcorrected. When the lower limit thereof is exceeded, the power of lens configuration is large, so that it is impossible to sufficiently correct coma. The condition (22) is a condition required for correcting field curvature. When the upper limit thereof is exceeded, field curvature is undercorrected. When the lower limit thereof is exceeded, field curvature is overcorrected. The condition (23) is a condition for determining the powers of the first and second lens elements. When the upper limit thereof is exceeded, the aberration correcting load on the second lens element increases, so that it is impossible to sufficiently correct aberrations. When the lower limit thereof is exceeded, the positive power of the first lens element increases, so that both spherical aberration and astigmatism are undercorrected.

Values in connection with the conditions (18) to (23) for the eleventh to thirteenth embodiments are shown in Table 20.

Figure 27:
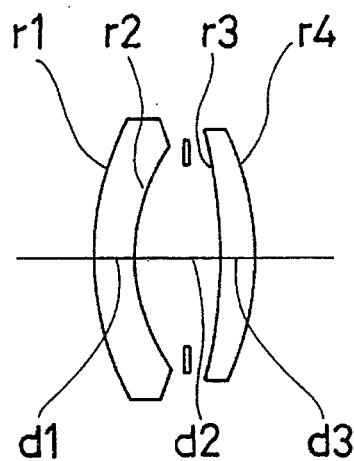
FIG. 27 is a cross-sectional view showing the lens arrangement of a fourteenth embodiment of the present invention.
Figure 28A:
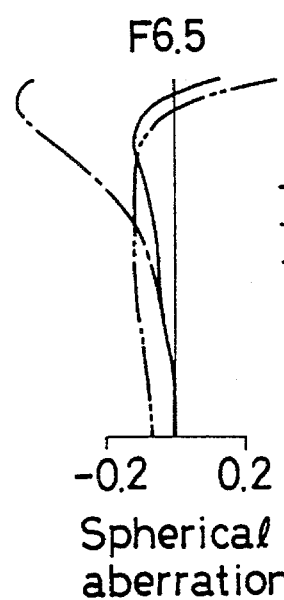
FIGS. 28A to 28C are graphic representations of spherical aberration, astigmatism and distortion of the lens system of FIG. 27, respectively.
Figure 28B:
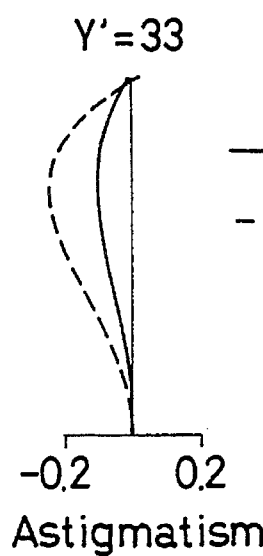
Figure 28C:
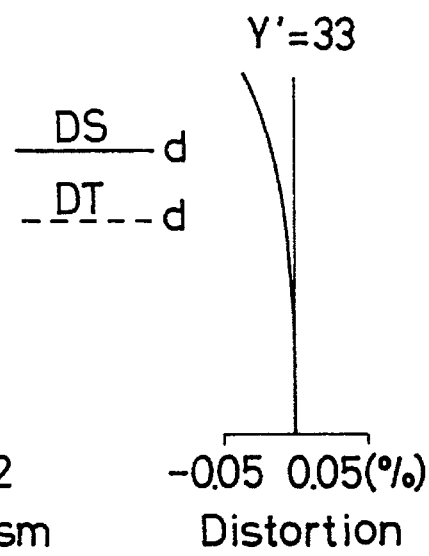
Figure 29:
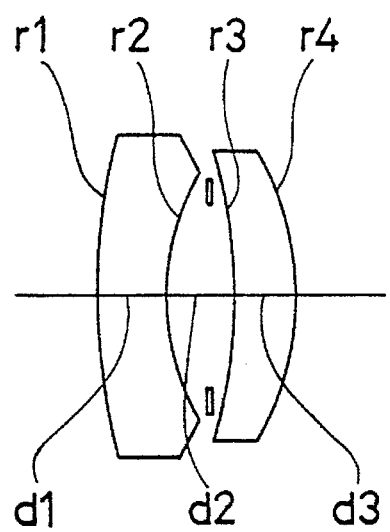
FIG. 29 is a cross-sectional view showing the lens arrangement of a fifteenth embodiment of the present invention.
Figure 30A:
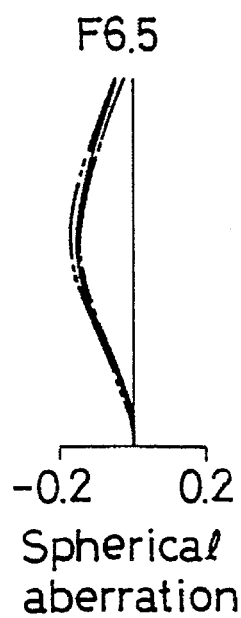
FIGS. 30A to 30C are graphic representations of spherical aberration, astigmatism and distortion of the lens system of FIG. 29, respectively.
Figure 30B:
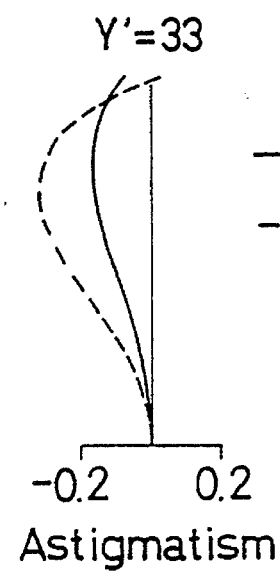
Figure 30C:
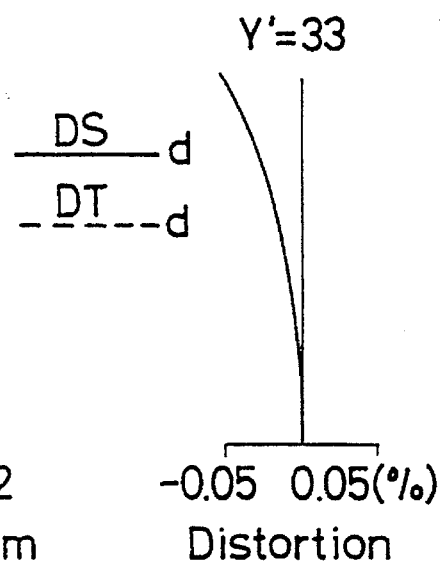

As the fifth implementations, fourteenth and fifteenth embodiments will be described. The lens arrangements thereof are shown in FIGS. 27 and 29, respectively. These embodiments comprise a first meniscus lens element convex to the object side and a second meniscus lens element convex to the image side. In the first lens element, the power of lens configuration is negative and the power of lens material is positive, and the total power of this lens element is positive. In the second lens element, the power of lens configuration is positive and the power of lens material is negative, and the total power of this lens element is positive. Since the powers of lens configuration and lens material of the first lens element and those of the second lens element are opposite, aberration correction is excellently made.

Numerical data of the fourteenth and fifteenth embodiments are shown in Tables 14 and 15. Spherical aberration, astigmatism and distortion thereof are shown in FIGS. 28A to 28C and 30A to 30C. Similarly to the previously-described implementations, the refractive power distribution is generally defined by the equation (3).

It is required that these embodiments fulfill the following conditions:

$$v1' < v10 \tag{24}$$

$$0 < v2' < v20 \tag{25}$$

$$-2.2 < \frac{\psi 2S}{\psi 2M} < -1.0 \tag{26}$$

$$-1.0 < \frac{\psi 1S}{\psi 1M} < -0.6 \tag{27}$$

$$0.1 < \Sigma P < 0.2 \tag{28}$$

$$1.0 < \frac{f1}{f2} < 2.0 \tag{29}$$

The conditions (24) and (25) are conditions for correcting chromatic aberration. When these conditions are not fulfilled, it is impossible to correct chromatic aberration. The condition (26) is a condition for determining the powers of lens configuration and lens material of the second lens element. When the lower limit thereof is exceeded, spherical aberration is undercorrected, and it is impossible to sufficiently correct coma and chromatic aberration. When the upper limit thereof is exceeded, spherical aberration is overcorrected, and field curvature increases. The condition (27) is a condition for determining the powers of lens configuration and lens material of the first lens element. When the upper limit thereof is exceeded, spherical aberration is undercorrected. When the lower limit thereof is exceeded, spherical aberration is overcorrected, and it is impossible to sufficiently correct chromatic aberration.

The condition (28) is a condition for correcting field curvature. When the upper limit thereof is exceeded, field curvature is undercorrected. When the lower limit thereof is exceeded, field curvature is overcorrected. The condition (29) is a condition for determining the powers of the first and second lens elements. When the upper limit thereof is exceeded, the aberration correcting load on the second lens element increases, so that spherical aberration is undercorrected, and astigmatism is undercorrected. When the lower limit thereof is exceeded, the positive power of the first lens element increases, so that correction of chromatic aberration and correction of astigmatism are not well-balanced.

Values in connection with the conditions (24) to (29) for the fourteenth and fifteenth embodiments are shown in Table 21.

Obviously, many modifications and variations of the present invention are possible in light of the above teachings. It is therefore to be understood that within the scope of the appended claims, the invention may be practiced other than as specifically described.

TABLE 1

(1st Embodiment)

$f = 220.12$    FNo. $= 10.0$

| Radius of Curvature | Axial Distance | Refractive Index (Nd) | Abbe Number (vd) |
|---|---|---|---|
| r1  54.027 | | | |
| | d1  6.0 | | GRIN lens |
| r2  44.356 | | | |
| | d2  9.0 | | |

TABLE 1-continued (1st Embodiment)

| | | | | | |
|---|---|---|---|---|---|
| S | Aperture stop | | | | |
| | | d2' | 9.0 | | |
| r3 | −44.356 | | | | |
| | | d3 | 6.0 | | GRIN lens |
| r4 | −54.027 | | | | |

GRIN lens $N0 = 1.6910 \quad \nu0 = 54.8$
(Gradient index coefficients)

| | | | | |
|---|---|---|---|---|
| d-line | N1 | $-0.398640 \times 10^{-3}$ | N2 | $0.458588 \times 10^{-7}$ |
| | N3 | $-0.1142775 \times 10^{-10}$ | | |
| F-line | N1 | $-0.400500 \times 10^{-3}$ | N2 | $0.460728 \times 10^{-7}$ |
| | N3 | $-0.114811 \times 10^{-10}$ | | |
| C-line | N1 | $-0.397843 \times 10^{-3}$ | N2 | $0.457670 \times 10^{-7}$ |
| | N3 | $-0.114049 \times 10^{-10}$ | | |

Condition $\nu_{1d} = 150$

TABLE 2

(2nd Embodiment)

$f = 200.1 \quad FNo. = 10.0$

| Radius of Curvature | Axial Distance | Refractive Index (Nd) | Abbe Number (νd) |
|---|---|---|---|
| r1 42.247 | | | |
| | d1 4.0 | | |
| r2 35.027 | | GRIN lens | |
| | d2 7.0 | | |
| S Aperture stop | | | |
| | d2' 7.0 | | |
| r3 −35.027 | | | |
| | d3 4.0 | | GRIN lens |
| r4 −42.247 | | | |

GRIN lens $N0 = 1.5891 \quad \nu0 = 61.1$
(Gradient index coefficients)

| | | | | |
|---|---|---|---|---|
| d-line | N1 | $-0.616896 \times 10^{-3}$ | N2 | $0.172431 \times 10^{-6}$ |
| | N3 | $-0.425501 \times 10^{-9}$ | N4 | $0.241363 \times 10^{-11}$ |
| F-line | N1 | $-0.619774 \times 10^{-3}$ | N2 | $0.173236 \times 10^{-6}$ |
| | N3 | $-0.427486 \times 10^{-9}$ | N4 | $0.242490 \times 10^{-11}$ |
| C-line | N1 | $-0.615661 \times 10^{-3}$ | N2 | $0.172087 \times 10^{-6}$ |
| | N3 | $-0.424650 \times 10^{-9}$ | N4 | $0.240881 \times 10^{-11}$ |

Condition $\nu_{1d} = 150$

TABLE 3

(3rd Embodiment)

$f = 200.1 \quad FNo. = 10.0$

| Radius of Curvature | Axial Distance | Refractive Index (Nd) | Abbe Number (νd) |
|---|---|---|---|
| r1 43.806 | | | |
| | d1 5.00 | | |
| r2 39.494 | | GRIN lens | |
| | d2 6.50 | | |
| S Aperture stop | | | |
| | d2' 6.50 | | |
| r3 −39.494 | | | |
| | d3 5.00 | | GRIN lens |
| r4 −43.806 | | | |

GRIN lens $N0 = 1.7440 \quad \nu0 = 44.9$

TABLE 3-continued (3rd Embodiment)

(Gradient index coefficients)

| | | | | |
|---|---|---|---|---|
| d-line | N2 | $-0.362601 \times 10^{-3}$ | N4 | $-0.709050 \times 10^{-8}$ |
| | N6 | $0.600650 \times 10^{-10}$ | | |
| F-line | N2 | $-0.363507 \times 10^{-3}$ | N4 | $-0.710823 \times 10^{-8}$ |
| | N6 | $0.602152 \times 10^{-10}$ | | |
| C-line | N2 | $-0.362212 \times 10^{-3}$ | N4 | $-0.708290 \times 10^{-8}$ |
| | N6 | $0.600007 \times 10^{-10}$ | | |

Condition $\nu_{1d} = 280$

TABLE 4

(4th Embodiment)

$f = 200.0 \quad FNo. = 8.0$

| Radius of Curvature | Axial Distance | Refractive Index (Nd) | Abbe Number (νd) |
|---|---|---|---|
| r1 60.645 | | | |
| | d1 9.0 | | |
| r2 53.608 | | GRIN lens | |
| | d2 8.0 | | |
| S Aperture stop | | | |
| | d2' 8.0 | | |
| r3 −53.608 | | | |
| | d3 9.0 | | GRIN lens |
| r4 −60.645 | | | |

GRIN lens $N0 = 1.8042 \quad \nu0 = 46.5$
(Gradient index coefficients)

| | | | | |
|---|---|---|---|---|
| d-line | N2 | $-0.195219 \times 10^{-3}$ | N4 | $-0.434268 \times 10^{-8}$ |
| | N6 | $0.229799 \times 10^{-10}$ | | |
| F-line | N2 | $-0.195561 \times 10^{-3}$ | N4 | $-0.435028 \times 10^{-8}$ |
| | N6 | $0.230201 \times 10^{-10}$ | | |
| C-line | N2 | $-0.195073 \times 10^{-3}$ | N4 | $-0.433943 \times 10^{-8}$ |
| | N6 | $0.229627 \times 10^{-10}$ | | |

Condition $\nu_{1d} = 400$

TABLE 5

(5th Embodiment)

$f = 80.2 \quad FNo. = 6.5$

| Radius of Curvature | Axial Distance | Refractive Index (Nd) | Abbe Number (νd) |
|---|---|---|---|
| r1 19.293 | | | |
| | d1 2.45 | | GRIN lens 1 |
| r2 16.472 | | | |
| | d2 9.25 | | |
| r3 −23.466 | | | |
| | d3 2.70 | | GRIN lens 2 |
| r4 −32.932 | | | |
| | Σd = 14.40 | | |

GRIN lens 1

$N10 = 1.7545 \quad \nu10 = 51.6$
(Gradient index coefficients)

| | | | | |
|---|---|---|---|---|
| d-line | N2d | $-0.21795 \times 10^{-2}$ | N4d | $-0.90912 \times 10^{-7}$ |
| | N6d | $0.38546 \times 10^{-8}$ | | |
| F-line | N2F | $-0.21875 \times 10^{-2}$ | N4F | $-0.91247 \times 10^{-7}$ |
| | N6F | $0.38688 \times 10^{-8}$ | | |
| C-line | N2C | $-0.21760 \times 10^{-2}$ | N4C | $-0.90768 \times 10^{-7}$ |
| | N6C | $0.38485 \times 10^{-8}$ | | |

GRIN lens 2

$N20 = 1.6172 \quad \nu20 = 54.0$

TABLE 5-continued (5th Embodiment)

(Gradient index coefficients)

| | | | | |
|---|---|---|---|---|
| d-line | N2d | $-0.25582 \times 10^{-2}$ | N4d | $0.43830 \times 10^{-5}$ |
| | N6d | $-0.26498 \times 10^{-8}$ | | |
| F-line | N2F | $-0.25737 \times 10^{-2}$ | N4F | $0.44096 \times 10^{-5}$ |
| | N6F | $-0.26659 \times 10^{-8}$ | | |
| C-line | N2C | $-0.25515 \times 10^{-2}$ | N4C | $0.43715 \times 10^{-5}$ |
| | N6C | $-0.26429 \times 10^{-8}$ | | |

TABLE 6

(6th Embodiment)

f = 80.5    FNo. = 6.5

| Radius of Curvature | Axial Distance | Refractive Index (Nd) | Abbe Number (νd) |
|---|---|---|---|
| r1   19.181 | | | |
| | d1   2.45 | GRIN lens 1 | |
| r2   16.217 | | | |
| | d2   9.91 | | |
| r3   −24.037 | | | |
| | d3   2.49 | GRIN lens 2 | |
| r4   −36.661 | | | |
| | Σd = 14.85 | | |

GRIN lens 1

N10 = 1.7130    ν10 = 53.9
(Gradient index coefficients)

| | | | | |
|---|---|---|---|---|
| d-line | N2d | $-0.21955 \times 10^{-2}$ | N4d | $0.22363 \times 10^{-6}$ |
| | N6d | $0.39555 \times 10^{-8}$ | | |
| F-line | N2F | $-0.22032 \times 10^{-2}$ | N4F | $0.22441 \times 10^{-6}$ |
| | N6F | $0.39693 \times 10^{-8}$ | | |
| C-line | N2C | $-0.21922 \times 10^{-2}$ | N4C | $0.22329 \times 10^{-6}$ |
| | N6C | $0.39495 \times 10^{-8}$ | | |

GRIN lens 2

N20 = 1.5714    ν20 = 52.6
(Gradient index coefficients)

| | | | | |
|---|---|---|---|---|
| d-line | N2d | $-0.29765 \times 10^{-2}$ | N4d | $0.68516 \times 10^{-5}$ |
| | N6d | $-0.83169 \times 10^{-8}$ | | |
| F-line | N2F | $-0.29973 \times 10^{-2}$ | N4F | $0.68995 \times 10^{-5}$ |
| | N6F | $-0.83751 \times 10^{-8}$ | | |
| C-line | N2C | $-0.29675 \times 10^{-2}$ | N4C | $0.68310 \times 10^{-5}$ |
| | N6C | $-0.82919 \times 10^{-8}$ | | |

TABLE 7

(7th Embodiment)

f = 80.0    FNo. = 6.5

| Radius of Curvature | Axial Distance | Refractive Index (Nd) | Abbe Number (νd) |
|---|---|---|---|
| r1   25.000 | | | |
| | d1   3.58 | GRIN lens 1 | |
| r2   49.999 | | | |
| | d2   7.57 | | |
| r3   −12.556 | | | |
| | d3   5.27 | GRIN lens 2 | |
| r4   −25.844 | | | |
| | Σd = 16.42 | | |

GRIN lens 1

N10 = 1.7545    ν10 = 51.6
(Gradient index coefficients)

| | | | | |
|---|---|---|---|---|
| d-line | N2d | $0.94985 \times 10^{-3}$ | N4d | $0.17564 \times 10^{-5}$ |
| | N6d | $-0.61095 \times 10^{-8}$ | N8d | $-0.28143 \times 10^{-10}$ |
| F-line | N2F | $0.97644 \times 10^{-3}$ | N4F | $0.18056 \times 10^{-5}$ |
| | N6F | $-0.62806 \times 10^{-8}$ | N8F | $-0.28931 \times 10^{-10}$ |
| C-line | N2C | $0.93845 \times 10^{-3}$ | N4C | $0.17354 \times 10^{-5}$ |
| | N6C | $-0.60362 \times 10^{-8}$ | N8C | $-0.27805 \times 10^{-10}$ |

GRIN lens 2

N20 = 1.5891    ν20 = 61.1
(Gradient index coefficients)

| | | | | |
|---|---|---|---|---|
| d-line | N2d | $-0.23564 \times 10^{-2}$ | N4d | $0.47788 \times 10^{-5}$ |
| | N6d | $-0.89227 \times 10^{-8}$ | N8d | $0.97269 \times 10^{-10}$ |
| F-line | N2F | $-0.23729 \times 10^{-2}$ | N4F | $0.48122 \times 10^{-5}$ |
| | N6F | $-0.89852 \times 10^{-8}$ | N8F | $0.97950 \times 10^{-10}$ |
| C-line | N2C | $-0.23493 \times 10^{-2}$ | N4C | $0.47644 \times 10^{-5}$ |
| | N6C | $-0.88960 \times 10^{-8}$ | N8C | $0.96977 \times 10^{-10}$ |

TABLE 8

(8th Embodiment)

f = 80.0    FNo. = 6.5

| Radius of Curvature | Axial Distance | Refractive Index (Nd) | Abbe Number (νd) |
|---|---|---|---|
| r1   28.000 | | | |
| | d1   3.49 | GRIN lens 1 | |
| r2   49.999 | | | |
| | d2   8.07 | | |
| r3   −12.786 | | | |
| | d3   4.90 | GRIN lens 2 | |
| r4   −23.526 | | | |
| | Σd = 16.45 | | |

GRIN lens 1

N10 = 1.7545    ν10 = 51.6
(Gradient index coefficients)

| | | | | |
|---|---|---|---|---|
| d-line | N2d | $0.58480 \times 10^{-3}$ | N4d | $0.44491 \times 10^{-6}$ |
| | N6d | $-0.51571 \times 10^{-8}$ | N8d | $-0.28058 \times 10^{-10}$ |
| F-line | N2F | $0.60634 \times 10^{-3}$ | N4F | $0.46130 \times 10^{-6}$ |
| | N6F | $-0.53470 \times 10^{-8}$ | N8F | $-0.29092 \times 10^{-10}$ |
| C-line | N2C | $0.57557 \times 10^{-3}$ | N4C | $0.43788 \times 10^{-6}$ |
| | N6C | $-0.50756 \times 10^{-8}$ | N8C | $-0.27615 \times 10^{-10}$ |

GRIN lens 2

N20 = 1.5891    ν20 = 61.1
(Gradient index coefficients)

| | | | | |
|---|---|---|---|---|
| d-line | N2d | $-0.22997 \times 10^{-2}$ | N4d | $0.38522 \times 10^{-5}$ |
| | N6d | $-0.81238 \times 10^{-8}$ | N8d | $0.97324 \times 10^{-10}$ |
| F-line | N2F | $-0.23150 \times 10^{-2}$ | N4F | $0.38778 \times 10^{-5}$ |
| | N6F | $-0.81780 \times 10^{-8}$ | N8F | $0.97972 \times 10^{-10}$ |
| C-line | N2C | $-0.22931 \times 10^{-2}$ | N4C | $0.38411 \times 10^{-5}$ |
| | N6C | $-0.81006 \times 10^{-8}$ | N8C | $0.97045 \times 10^{-10}$ |

TABLE 9

(9th Embodiment)

f = 80.9    FNo. = 6.5

| Radius of Curvature | Axial Distance | Refractive Index (Nd) | Abbe Number (νd) |
|---|---|---|---|
| r1   40.160 | | | |
| | d1   3.34 | GRIN lens 1 | |
| r2   22.988 | | | |
| | d2   14.09 | | |
| r3   −28.197 | | | |
| | d3   2.45 | GRIN lens 2 | |
| r4   −26.458 | | | |

TABLE 9-continued (9th Embodiment)

$\Sigma d = 19.88$

GRIN lens 1

$N10 = 1.7725$   $v10 = 49.8$
(Gradient index coefficients)

| | | | | |
|---|---|---|---|---|
| d-line | N2d | $-0.28449 \times 10^{-2}$ | N4d | $0.59569 \times 10^{-5}$ |
| | N6d | $-0.70296 \times 10^{-8}$ | | |
| F-line | N2F | $-0.28698 \times 10^{-2}$ | N4F | $0.60090 \times 10^{-5}$ |
| | N6F | $-0.70911 \times 10^{-8}$ | | |
| C-line | N2C | $-0.28343 \times 10^{-2}$ | N4C | $0.59346 \times 10^{-5}$ |
| | N6C | $-0.70033 \times 10^{-8}$ | | |

GRIN lens 2

$N20 = 1.7545$   $v20 = 51.6$
(Gradient index coefficients)

| | | | | |
|---|---|---|---|---|
| d-line | N2d | $-0.99339 \times 10^{-3}$ | N4d | $-0.79429 \times 10^{-6}$ |
| | N6d | $-0.21551 \times 10^{-8}$ | | |
| F-line | N2F | $-0.98607 \times 10^{-3}$ | N4F | $-0.78844 \times 10^{-6}$ |
| | N6F | $-0.21392 \times 10^{-8}$ | | |
| C-line | N2C | $-0.99652 \times 10^{-3}$ | N4C | $-0.79680 \times 10^{-6}$ |
| | N6C | $-0.21619 \times 10^{-8}$ | | |

TABLE 10

(10th Embodiment)

$f = 80.9$   FNo. = 6.5

| Radius of Curvature | Axial Distance | Refractive Index (Nd) | Abbe Number (vd) |
|---|---|---|---|
| r1  36.031 | | | |
| | d1  2.82 | GRIN lens 1 | |
| r2  20.673 | | | |
| | d2  13.15 | | |
| r3  -30.084 | | | |
| | d3  3.00 | GRIN lens 2 | |
| r4  -25.638 | | | |
| | $\Sigma d = 18.97$ | | |

GRIN lens 1

$N10 = 1.8050$   $v10 = 41.0$
(Gradient index coefficients)

| | | | | |
|---|---|---|---|---|
| d-line | N2d | $-0.38397 \times 10^{-2}$ | N4d | $0.10307 \times 10^{-4}$ |
| | N6d | $-0.17589 \times 10^{-7}$ | | |
| F-line | N2F | $-0.38780 \times 10^{-2}$ | N4F | $0.10410 \times 10^{-4}$ |
| | N6F | $-0.17765 \times 10^{-7}$ | | |
| C-line | N2C | $-0.38232 \times 10^{-2}$ | N4C | $0.10262 \times 10^{-4}$ |
| | N6C | $-0.17514 \times 10^{-7}$ | | |

GRIN lens 2

$N20 = 1.6385$   $v20 = 55.6$
(Gradient index coefficients)

| | | | | |
|---|---|---|---|---|
| d-line | N2d | $-0.40338 \times 10^{-3}$ | N4d | $-0.11601 \times 10^{-7}$ |
| | N6d | $-0.20875 \times 10^{-8}$ | | |
| F-line | N2F | $-0.39774 \times 10^{-3}$ | N4F | $-0.11439 \times 10^{-7}$ |
| | N6F | $-0.20582 \times 10^{-8}$ | | |
| C-line | N2C | $-0.40580 \times 10^{-3}$ | N4C | $-0.11671 \times 10^{-7}$ |
| | N6C | $-0.21000 \times 10^{-8}$ | | |

TABLE 11

(11th Embodiment)

$f = 80.0$   FNo. = 6.5

| Radius of Curvature | Axial Distance | Refractive Index (Nd) | Abbe Number (vd) |
|---|---|---|---|
| r1  43.132 | | | |
| | d1  3.75 | GRIN lens 1 | |
| r2  44.029 | | | |
| | d2  8.69 | | |
| r3  -13.523 | | | |
| | d3  3.74 | GRIN lens 2 | |
| r4  -19.086 | | | |
| | $\Sigma d = 16.18$ | | |

GRIN lens 1

$N10 = 1.7545$   $v10 = 51.6$
(Gradient index coefficients)

| | | | | |
|---|---|---|---|---|
| d-line | N2d | $-0.88634 \times 10^{-3}$ | N4d | $-0.51065 \times 10^{-6}$ |
| | N6d | $0.22210 \times 10^{-9}$ | N8d | $-0.26181 \times 10^{-10}$ |
| F-line | N2F | $-0.88944 \times 10^{-3}$ | N4F | $-0.51244 \times 10^{-6}$ |
| | N6F | $0.22288 \times 10^{-9}$ | N8F | $-0.26273 \times 10^{-10}$ |
| C-line | N2C | $-0.88501 \times 10^{-3}$ | N4C | $-0.50988 \times 10^{-6}$ |
| | N6C | $0.22177 \times 10^{-9}$ | N8C | $-0.26142 \times 10^{-10}$ |

GRIN lens 2

$N20 = 1.5891$   $v20 = 61.1$
(Gradient index coefficients)

| | | | | |
|---|---|---|---|---|
| d-line | N2d | $-0.20947 \times 10^{-2}$ | N4d | $0.14782 \times 10^{-5}$ |
| | N6d | $-0.58140 \times 10^{-8}$ | N8d | $0.95624 \times 10^{-10}$ |
| F-line | N2F | $-0.21021 \times 10^{-2}$ | N4F | $0.14834 \times 10^{-5}$ |
| | N6F | $-0.58344 \times 10^{-8}$ | N8F | $0.95959 \times 10^{-10}$ |
| C-line | N2C | $-0.20916 \times 10^{-2}$ | N4C | $0.14760 \times 10^{-5}$ |
| | N6C | $-0.58053 \times 10^{-8}$ | N8C | $0.95481 \times 10^{-10}$ |

TABLE 12

(12th Embodiment)

$f = 80.0$   FNo. = 6.5

| Radius of Curvature | Axial Distance | Refractive Index (Nd) | Abbe Number (vd) |
|---|---|---|---|
| r1  39.623 | | | |
| | d1  4.68 | GRIN lens 1 | |
| r2  40.503 | | | |
| | d2  6.33 | | |
| r3  -13.324 | | | |
| | d3  4.23 | GRIN lens 2 | |
| r4  -19.496 | | | |
| | $\Sigma d = 15.24$ | | |

GRIN lens 1

$N10 = 1.5891$   $v10 = 61.1$
(Gradient index coefficients)

| | | | | |
|---|---|---|---|---|
| d-line | N2d | $-0.78198 \times 10^{-3}$ | N4d | $-0.11672 \times 10^{-5}$ |
| | N6d | $0.76312 \times 10^{-8}$ | N8d | $-0.16338 \times 10^{-9}$ |
| F-line | N2F | $-0.78447 \times 10^{-3}$ | N4F | $-0.11709 \times 10^{-5}$ |
| | N6F | $0.76555 \times 10^{-8}$ | N8F | $-0.16390 \times 10^{-9}$ |
| C-line | N2C | $-0.78091 \times 10^{-3}$ | N4C | $-0.11656 \times 10^{-5}$ |
| | N6C | $0.76208 \times 10^{-8}$ | N8C | $-0.16316 \times 10^{-9}$ |

GRIN lens 2

$N20 = 1.5891$   $v20 = 61.1$
(Gradient index coefficients)

| | | | | |
|---|---|---|---|---|
| d-line | N2d | $-0.18907 \times 10^{-2}$ | N4d | $0.17720 \times 10^{-5}$ |
| | N6d | $-0.14520 \times 10^{-7}$ | N8d | $0.22788 \times 10^{-9}$ |
| F-line | N2F | $-0.18985 \times 10^{-2}$ | N4F | $0.17792 \times 10^{-5}$ |
| | N6F | $-0.14579 \times 10^{-7}$ | N8F | $0.22882 \times 10^{-9}$ |
| C-line | N2C | $-0.18874 \times 10^{-2}$ | N4C | $0.17688 \times 10^{-5}$ |
| | N6C | $-0.14494 \times 10^{-7}$ | N8C | $0.22748 \times 10^{-9}$ |

TABLE 13

(13th Embodiment)

f = 80.0  FNo. = 6.5

| Radius of Curvature | Axial Distance | Refractive Index (Nd) | Abbe Number (νd) |
|---|---|---|---|
| r1  38.933 | | | |
| | d1  4.49 | GRIN lens 1 | |
| r2  44.339 | | | |
| | d2  5.99 | | |
| r3  −13.242 | | | |
| | d3  4.41 | GRIN lens 2 | |
| r4  −19.031 | | | |
| | Σd = 14.89 | | |

GRIN lens 1

N10 = 1.7130    ν10 = 53.9
(Gradient index coefficients)

| d-line | N2d | −0.63960 × 10⁻³ | N4d | −0.16052 × 10⁻⁵ |
| | N6d | 0.66213 × 10⁻⁸ | N8d | −0.16914 × 10⁻⁹ |
| F-line | N2F | −0.64209 × 10⁻³ | N4F | −0.16114 × 10⁻⁵ |
| | N6F | 0.66471 × 10⁻⁸ | N8F | −0.16980 × 10⁻⁹ |
| C-line | N2C | −0.63854 × 10⁻³ | N4C | −0.16025 × 10⁻⁵ |
| | N6C | 0.66103 × 10⁻⁸ | N8C | −0.16886 × 10⁻⁹ |

GRIN lens 2

N20 = 1.5814    ν20 = 40.9
(Gradient index coefficients)

| d-line | N2d | −0.16705 × 10⁻² | N4d | 0.16099 × 10⁻⁵ |
| | N6d | −0.18662 × 10⁻⁷ | N8d | 0.27776 × 10⁻⁹ |
| F-line | N2F | −0.16783 × 10⁻² | N4F | 0.16174 × 10⁻⁵ |
| | N6F | −0.18749 × 10⁻⁷ | N8F | 0.27906 × 10⁻⁹ |
| C-line | N2C | −0.16672 × 10⁻² | N4C | 0.16067 × 10⁻⁵ |
| | N6C | −0.18625 × 10⁻⁷ | N8C | 0.27720 × 10⁻⁹ |

TABLE 14

(14th Embodiment)

f = 80.0  FNo. = 6.5

| Radius of Curvature | Axial Distance | Refractive Index (Nd) | Abbe Number (νd) |
|---|---|---|---|
| r1  18.384 | | | |
| | d1  2.52 | GRIN lens 1 | |
| r2  10.443 | | | |
| | d2  5.64 | | |
| r3  −29.998 | | | |
| | d3  2.17 | GRIN lens 2 | |
| r4  −16.968 | | | |
| | Σd = 10.33 | | |

GRIN lens 1

N10 = 1.6910    ν10 = 54.8
(Gradient index coefficients)

| d-line | N2d | −0.57933 × 10⁻² | N4d | 0.26979 × 10⁻⁴ |
| | N6d | −0.29548 × 10⁻⁷ | N8d | 0.78201 × 10⁻¹⁰ |
| F-line | N2F | −0.58557 × 10⁻² | N4F | 0.27270 × 10⁻⁴ |
| | N6F | −0.29866 × 10⁻⁷ | N8F | 0.79043 × 10⁻¹⁰ |
| C-line | N2C | −0.57666 × 10⁻² | N4C | 0.26855 × 10⁻⁴ |
| | N6C | −0.29412 × 10⁻⁷ | N8C | 0.77840 × 10⁻¹⁰ |

GRIN lens 2

N20 = 1.6545    ν20 = 33.9
(Gradient index coefficients)

| d-line | N2d | 0.20775 × 10⁻² | N4d | 0.14042 × 10⁻⁴ |
| | N6d | −0.11763 × 10⁻⁷ | N8d | −0.47234 × 10⁻⁹ |
| F-line | N2F | 0.21745 × 10⁻² | N4F | 0.14697 × 10⁻⁴ |
| | N6F | −0.12312 × 10⁻⁷ | N8F | −0.49438 × 10⁻⁹ |

TABLE 14-continued (14th Embodiment)

| C-line | N2C | 0.20360 × 10⁻² | N4C | 0.13761 × 10⁻⁴ |
| | N6C | −0.11528 × 10⁻⁷ | N8C | −0.46289 × 10⁻⁹ |

TABLE 15

(15th Embodiment)

f = 80.0  FNo. = 6.5

| Radius of Curvature | Axial Distance | Refractive Index (Nd) | Abbe Number (νd) |
|---|---|---|---|
| r1  38.813 | | | |
| | d1  4.39 | GRIN lens 1 | |
| r2  15.300 | | | |
| | d2  4.16 | | |
| r3  −29.998 | | | |
| | d3  3.77 | GRIN lens 2 | |
| r4  −16.967 | | | |
| | Σd = 12.32 | | |

GRIN lens 1

N10 = 1.6968    ν10 = 56.5
(Gradient index coefficients)

| d-line | N2d | −0.34784 × 10⁻² | N4d | 0.12825 × 10⁻⁴ |
| | N6d | −0.29111 × 10⁻⁷ | N8d | 0.25278 × 10⁻⁸ |
| F-line | N2F | −0.35132 × 10⁻² | N4F | 0.12953 × 10⁻⁴ |
| | N6F | −0.29402 × 10⁻⁷ | N8F | 0.25531 × 10⁻⁸ |
| C-line | N2C | −0.34635 × 10⁻² | N4C | 0.12770 × 10⁻⁴ |
| | N6C | −0.28986 × 10⁻⁷ | N8C | 0.25169 × 10⁻⁸ |

GRIN lens 2

N2 = 1.5891    ν2 = 61.1
(Gradient index coefficients)

| d-line | N2d | 0.11611 × 10⁻² | N4d | 0.43793 × 10⁻⁵ |
| | N6d | 0.31491 × 10⁻⁷ | N8d | −0.45023 × 10⁻⁹ |
| F-line | N2F | 0.11901 × 10⁻² | N4F | 0.44888 × 10⁻⁵ |
| | N6F | 0.32278 × 10⁻⁷ | N8F | −0.46149 × 10⁻⁹ |
| C-line | N2C | 0.11486 × 10⁻² | N4C | 0.43324 × 10⁻⁵ |
| | N6C | 0.31153 × 10⁻⁷ | N8C | −0.44541 × 10⁻⁹ |

TABLE 16

| | ν0 | ν$_{Id}$ | ΣP |
|---|---|---|---|
| 1st embodiment | 54.8 | 150 | 0.014 |
| 2nd embodiment | 61.1 | 150 | 0.062 |
| 3rd embodiment | 44.9 | 280 | 0.053 |
| 4th embodiment | 46.5 | 400 | 0.048 |

TABLE 17

| Condition | | 5th embodiment | 6th embodiment |
|---|---|---|---|
| (4) | ν1'/ν10 | 190/51.57 | 200/53.93 |
| | ν2'/ν20 | 115/54.00 | 100/52.85 |
| (5) | f1/f2 | 1.094 | 1.151 |
| (6) | ΣP | 0.0242 | 0.0450 |
| (7) | ψ1S/ψ1M | −0.393 | −0.414 |
| | ψ2S/ψ2M | −0.488 | −0.513 |

TABLE 18

| Condition | | 7th embodiment | 8th embodiment |
|---|---|---|---|
| (8) | $\frac{v1'}{v10}$ | $\frac{25}{51.6}$ | $\frac{19}{51.6}$ |
| (9) | $\frac{f2}{f}$ | 2.565 | 2.281 |
| (10) | $\frac{\psi 2S}{\psi 1M}$ | −0.828 | −0.776 |
| (11) | $\Sigma P$ | −0.0013 | 0.0118 |
| (12) | $\frac{f1}{f2}$ | 0.523 | 0.635 |

TABLE 19

| Condition | | 9th embodiment | 10th embodiment |
|---|---|---|---|
| (4) | $\frac{v1'}{v10}$ | $\frac{80}{49.77}$ | $\frac{70}{40.97}$ |
| (13) | $v2'$ | −95 | −50 |
| (14) | $\frac{v1'}{v2'}$ | −0.84 | −1.40 |
| (15) | $\frac{f1}{f2}$ | 1.28 | 1.07 |
| (17) | $\Sigma P$ | 0.07 | 0.08 |
| (18) | $\frac{\psi 2S}{\psi 2M}$ | 0.58 | 1.92 |

TABLE 20

| Condition | | 11th embodiment | 12th embodiment | 13th embodiment |
|---|---|---|---|---|
| (18) | $\frac{v20}{v2'}$ | 200 | 170 | 150 |
| (19) | $\frac{f2}{f}$ | 1.99 | 2.19 | 1.44 |
| (20) | $\frac{\psi 1S}{\psi 1M}$ | 0.15 | 0.13 | 0.52 |
| (21) | $\frac{\psi 2S}{\psi 2M}$ | −0.61 | −0.65 | −0.65 |
| (22) | $\Sigma P$ | 0.0046 | 0.0083 | 0.0100 |
| (23) | $\frac{f1}{f2}$ | 0.82 | 0.69 | 0.61 |

TABLE 21

| Condition | | 14th embodiment | 15th embodiment |
|---|---|---|---|
| (24) | $\frac{v1'}{v10}$ | $\frac{65}{54.75}$ | $\frac{70}{56.47}$ |
| (25) | $\frac{v2'}{v20}$ | $\frac{15}{33.86}$ | $\frac{28}{61.11}$ |
| (26) | $\frac{\psi 2S}{\psi 2M}$ | −1.98 | −1.27 |
| (27) | $\frac{\psi 1S}{\psi 1M}$ | −0.85 | −0.88 |
| (28) | $\Sigma P$ | 0.13 | 0.18 |
| (29) | $\frac{f1}{f2}$ | 1.78 | 1.42 |

What is claimed is:

1. A radial gradient index lens system having a refractive index distribution where a refractive index decreases from an optical axis along a height, said gradient index lens system being of a completely symmetrical type, about an aperture stop, comprising
two meniscus lens elements having a refractive index distribution where a refractive index decreases from an optical axis along a height, whose convex surfaces have a larger radius of curvature than concave surfaces, said meniscus lens elements being arranged symmetrically with respect to the aperture stop so that the convex surfaces thereof face an object side and an image side, respectively, wherein both of said two meniscus lens elements fulfill the following condition:

$$v0 < v1d$$

where v0 represents an axial Abbe number of the lens element; and where v1d is equal to $$\frac{N1d}{N1F - N1C}$$

where N1d represents a secondary gradient index coefficient of d-line, N1F represents a secondary gradient index coefficient of F-line and N1C represents a secondary gradient index coefficient of C-line.

2. A radial gradient index lens system as claimed in claim 1, wherein said gradient index lens system is for use in a copying apparatus and has a projection capability characteristic of a letter-size document.

3. A radial gradient index lens system as claimed in claim 1, wherein the following conditions are fulfilled:

$$0.20 > \Sigma P > -0.05$$

where:

$\Sigma P$ represents a Petzval sum of the lens system.

4. A radial gradient index lens system as claimed in claim 3, wherein said gradient index lens system is for use in a copying apparatus.

5. A radial gradient index lens system comprising two lens elements having a refractive power distribution from an optical axis along a height, said two lens elements consisting of, from the object side, a first lens element where a power of lens configuration is positive and a power of lens material is positive and a total power is positive, and a second lens element where a power of lens configuration is negative and a power of lens material is positive a total power is positive, wherein the following conditions are fulfilled:

$$v20 < v2'$$

$$0.1 < \frac{\psi 1S}{\psi 1M} < 1$$

$$-0.7 < \frac{\psi 2S}{\psi 2M} < -0.5$$

$$0 < \Sigma P < 0.015$$

$$0.5 < \frac{f1}{f2} < 1$$

where v20 represents an axial Abbe number of a second lens element;

v20' is calculated by $$\frac{N2d}{N2F - N2C}$$

where N2d represents a secondary gradient index coefficient of d-line of the second lens element, N2F represents a secondary gradient index coefficient of F-line of the second lens element and N2C represents a secondary gradient index coefficient of C-line of the second lens element;

F represents a focal length of an entire lens system (total of the lens configuration and lens material);

f1 represents a focal length of a first lens element (total of the lens configuration and lens material);

f2 represents a focal length of the second lens element (total of the lens configuration and lens material);

$\psi 2S$ represents the power of lens configuration of the second lens element;

$\psi 2M$ represents the power of lens material of the second lens element;

$\Sigma P$ represents a Petzval sum of the entire lens system;

$\psi 1S$ represents the power of lens configuration of the first lens element; and $\psi 1M$ represents the power of lens material of the first lens element.

6. A radial gradient index lens system as claimed in claim 5, wherein said gradient index lens system is for use as a reading optical system.

7. A radial gradient index lens system comprising two lens elements having a refractive power distribution from an optical axis along a height, said two lens elements consisting of, from the object side, a first lens element where a power of lens configuration is negative and a power of lens material is positive and a total power is positive, and a second lens element where a power of lens configuration is positive and a power of lens material is negative and a total power is positive, wherein the following conditions are fulfilled:

$$\upsilon 1' < \upsilon 10$$

$$0 < \upsilon 2' < \upsilon 20$$

$$-2.2 < \frac{\psi 2S}{\psi 2M} < -1.0$$

$$-1.0 < \frac{\psi 1S}{\psi 1M} < 0.6$$

$$0.1 < \Sigma P < 0.2$$

$$1.0 < \frac{f1}{f2} < 2.0$$

where:

$\nu 10$ represents an axial Abbe number of the first lens element;

$\nu 20$ represents an axial Abbe number of the second lens element;

$\nu 1'$ is equal to $$\frac{N_{2d}^1}{N_{2F}^1 - N_{2C}^1}$$

where $N_{2d}^1$ represents a secondary gradient index coefficient of d-line of the first lens element, $N_{2F}^1$ represents a secondary gradient index coefficient of F-line of the first lens element and $N_{2C}^1$ represents a secondary gradient index coefficient of C-line of the first lens element;

$\nu 2'$ is equal to $$\frac{N_{2d}^2}{N_{2F}^2 - N_{2C}^2}$$

where $N_{2d}^2$ represents a secondary gradient index coefficient of d-line of the second lens element, $N_{2F}^2$ represents a secondary gradient index coefficient of F-line of the second lens element and $N_{2C}^2$ represents a secondary gradient index coefficient of C-line of the second lens element;

f represents a focal length of an entire lens element (total of the lens configuration and lens material);

f1 represents a focal length of the first lens element (total of the lens configuration and lens material);

f2 represents a focal length of the second lens element (total of the lens configuration and lens material);

$\psi 2S$ represents the power of lens configuration of the second lens element;

$\psi 2M$ represents the power of lens material of the second lens element;

$\Sigma P$ represents a Petzval sum of the entire lens system;

$\psi 1S$ represents the power of lens configuration of the first lens element; and $\psi 1M$ represents the power of lens medium of the first lens element.

8. A radial gradient index lens system as claimed in claim 7, wherein said gradient index lens system is for use as a reading optical system.

9. A radial gradient index lens system consisting of two lens elements having a refractive index distribution from an optical axis along a height, wherein in both of the two lens elements, a power of lens configuration is negative and a power of lens material is positive, wherein both of the two lens elements fulfill the following condition:

$$\text{vi0} < \text{vi'}$$

where vi0 represents an axial Abbe number of an i-th lens element; and vi' is calculated by $$\frac{N_{2d}^i}{N_{2F}^i - N_{2C}^i}$$

where $N_{2F}^i$ represents a secondary gradient coefficient of F-line of the i-th lens element, $N_{2C}^i$ represents a secondary gradient index coefficient of C-line of the i-th lens element, $N_{2d}^i$ represents a secondary gradient index coefficient of d-line of the i-th lens element.

10. A radial gradient index lens system as claimed in claim 9, wherein said gradient index lens system is for use as a reading optical system.

11. A radial gradient index lens system as claimed in claim 9, wherein the following conditions are further fulfilled:

$$0.7 < \frac{f1}{f2} < 1.5$$

$$0 < \Sigma P < 0.10$$

$$-0.7 < \frac{\psi iS}{\psi iM} < -0.3$$

where f1 represents a focal length of the first lens element (total of the lens configuration and lens material), f2 represents a focal length of the second lens element (total of the lens configuration and lens material), $\psi iS$ represents to power of lens configuration of the ith lens element, $\psi iM$ represents the power of lens material of the ith lens element, and $\Sigma P$ represents a Petzval sum of the entire lens system.

12. A radial gradient index lens system as claimed in claim 11, wherein said gradient index lens system is for use as a reading optical system.

13. A radial gradient index lens system comprising two lens elements having a refractive index distribution from an optical axis along a height, said two lens elements consisting of, from the object side, of a first lens element where a power of lens configuration is positive and a power of lens material is negative and a total power is positive, and a second lens element where a power of lens configuration is negative and a power of lens material is positive and a total power is positive, wherein both of the two lens elements fulfill the following condition:

$$0 < v1' < v10$$

$$v20 < v2'$$

where v10 represents an axial Abbe number of a first lens element and v20 represents an axial Abbe number of a second lens element; and v1' and v2' are calculated by the general equation $$\frac{N_{2d}}{N_{2F} - N_{2C}}$$

where $N_{2F}{}^i$ represents a secondary gradient index coefficient of F-line of the i-th lens element, $N_{2C}{}^i$ represents a secondary gradient index coefficient of C-line of the i-th lens element, $N_{2d}{}^i$ represents a secondary gradient index coefficient of d-line of the i-th lens element where the i-th element can be either the first or second lens element.

14. A radial gradient index lens system as claimed in claim 13, wherein said gradient index lens is for use as a reading optical system.

15. A radial gradient index lens system comprising two lens elements having a refractive index distribution where a refractive index decreases from an optical axis along a height, said two lens elements consisting of, from the object side, a first lens element where a power of lens configuration is negative and a power of lens material is positive, and a second lens element where both of a power of lens configuration and a power of lens material is positive, wherein both of the two lens elements fulfill the following condition:

$$v10 < v1'$$

$$v2' < 0$$

v10 represents an axial Abbe number of the first lens element;

v1' and v2' are calculated by $$\frac{N_{2d}^i}{N_{2F}^i - N_{2C}^i}$$

where $N_{2F}{}^i$ represents a secondary gradient index coefficient of F-line of the i-th lens element, $N_{2C}{}^i$ represents a secondary gradient index coefficient of C-line of the i-th lens element, $N_{2d}{}^i$ represents a secondary gradient index coefficient of d-line of the i-th lens element.

16. A radial gradient index lens system as claimed in claim 15, wherein said gradient index lens system is for use as a reading optical system.

17. A radial gradient index lens system as claimed in claim 15, wherein the following conditions are fulfilled:

$$-2 < \frac{v1'}{v2'} < -0.5$$

where vi0 represents an axial Abbe number of an ith lens element, vi' is calculated by $$\frac{N_{2d}^i}{N_{2F}^i - N_{2C}^i}$$

where $N_{2d}{}^i$ represents a secondary gradient index coefficient of d-line of the ith lens element, $N_{2F}{}^i$ represents a secondary gradient index coefficient of F-line of the ith lens element and $N_{2C}{}^i$ represents a secondary gradient index coefficient of C-line of the ith lens element.

18. A radial gradient index lens system as claimed in claim 17, wherein said gradient index lens system is for use as a reading optical system.

19. A radial gradient index lens system as claimed in claim 17, wherein the following conditions are further fulfilled:

$$0.8 < \frac{f1}{f2} < 1.5$$

$$0.04 < \Sigma P < 0.11$$

$$\frac{\psi 2S}{\psi 2M} < -2.5$$

where f1 represents a focal length of the first lens element, f2 represents a focal length of the second lens element, ΣP represents a Petzval sum of the entire lens system, ψ2S represents the power of lens configuration of the second lens element, and ψ2M represents the power of lens material of the second lens element.

20. A radial gradrient index lens system as claimed in claim 19, wherein said gradient index lens system is for use as a reading optical system.

21. A radial gradient index lens system comprising two lens elements having a refractive index distribution from an optical axis along a height, wherein in a first lens element, a power of the lens configuration is positive and a power of the lens material is negative, wherein in a second lens element, a power of the lens configuration is negative and a power of the lens material is positive, and wherein the following condition is fulfilled:

$$0 < v1' < v10$$

where v1' is calculated by $$\frac{N2d}{N2F - N2C}$$

where N2d represents a secondary gradient index coefficient of d-line of a first lens element, N2F represents a secondary gradient index coefficient of F-line of the first lens element, N2C represents a secondary gradient index coefficient of C-line of the first lens element, and v10 represents an axial Abbe number of the first lens element.

22. A radial gradient index lens system as claimed in claim 21, wherein said gradient index lens system is for use as a reading optical system.

23. A radial gradient index lens system as claimed in claim 21, wherein the following conditions are further fulfilled:

$$2 < \frac{f2}{f} < 3$$

$$-0.9 < \frac{\psi 2S}{\psi 2M} < -0.7$$

-continued $$-0.01 < \Sigma P < 0.05$$

$$0.3 < \frac{f1}{f2} < 0.7$$

where f represents a focal length of an entire lens system, f1 represents a focal length of the first lens element (total of the lens configuration and lens material), f2 represents a focal length of a second lens element (total of the lens configuration and lens material), ψ2S represents the power of the lens configuration of the second lens element, ψ2M represents the power of lens material of the second lens element, and ΣP represents a Petzval sum.

24. A radial gradient index lens system as claimed in claim 23, wherein said gradient index lens system is for use as a reading optical system.

* * * * *